(12) United States Patent
Ni

(10) Patent No.: US 9,668,597 B2
(45) Date of Patent: *Jun. 6, 2017

(54) BEVERAGE BOTTLE WITH ACCESSIBLE STATION FOR PORTABLE ELECTRONIC DEVICE

(71) Applicant: SIMPLE HAPPINESS & HEALTH, San Marino, CA (US)

(72) Inventor: Zhenming Ni, San Marino, CA (US)

(73) Assignee: YUHAO INTERNATIONAL TRADING USA INC., San Marino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,610

(22) Filed: Jun. 1, 2015

(65) Prior Publication Data

US 2016/0221721 A1    Aug. 4, 2016

Related U.S. Application Data

(63) Continuation of application No. 14/611,274, filed on Feb. 1, 2015.

(30) Foreign Application Priority Data

Mar. 17, 2015   (CN) .......................... 2015 1 0116834

(51) Int. Cl.
| | | |
|---|---|---|
| *H04B 1/38* | (2015.01) | |
| *A47G 19/22* | (2006.01) | |
| *A45C 11/00* | (2006.01) | |
| *H04M 1/02* | (2006.01) | |
| *H05B 37/02* | (2006.01) | |
| *A45F 3/16* | (2006.01) | |
| *B65D 23/12* | (2006.01) | |
| *B65D 47/06* | (2006.01) | |

(52) U.S. Cl.
CPC .......... *A47G 19/2227* (2013.01); *A45C 11/00* (2013.01); *A45F 3/16* (2013.01); *A47G 19/2205* (2013.01); *B65D 23/12* (2013.01); *B65D 47/06* (2013.01); *H04M 1/0202* (2013.01); *H05B 37/0209* (2013.01); *A45C 2011/002* (2013.01)

(58) Field of Classification Search
USPC ................................ 455/550.1, 556.1, 575.1
See application file for complete search history.

(56) References Cited

U.S. PATENT DOCUMENTS 4,795,028 A * 1/1989 Wittig ................ B65D 81/3205
206/217
5,745,565 A * 4/1998 Wakefield .............. B60N 3/103
224/926

(Continued)

*Primary Examiner* — Fayyaz Alam
(74) *Attorney, Agent, or Firm* — Raymond Y. Chan; David and Raymond Patent Firm

(57) ABSTRACT

A beverage bottle for a portable electronic device, includes a hand-held container comprising a surrounding wall and having a fluid compartment formed within the surrounding wall, and an accessible station integrated with the hand-held container, wherein the accessible station has a window cavity for accommodating the portable electronic device therein so as to allow the portable electronic device through the window cavity. Therefore, the portable electronic device is carried and protected by the container and is accessible through the accessible station.

20 Claims, 22 Drawing Sheets

(56) References Cited

U.S. PATENT DOCUMENTS

| | | | | |
|---|---|---|---|---|
| 6,092,647 | A * | 7/2000 | Yeh | A47G 19/2227 206/217 |
| 6,189,755 | B1 * | 2/2001 | Wakefield | B60N 3/103 220/23.89 |
| 8,777,044 | B1 * | 7/2014 | Raymus | A47G 19/2272 215/12.1 |
| D742,693 | S * | 11/2015 | Spagnola | D7/507 |
| 2004/0086112 | A1 * | 5/2004 | Hilger | B60R 11/0241 379/455 |
| 2008/0223739 | A1 * | 9/2008 | Thompson | A47G 19/2227 206/217 |
| 2011/0303708 | A1 * | 12/2011 | Dudley | A45F 5/00 224/148.1 |
| 2014/0216959 | A1 * | 8/2014 | Raymus | A47G 19/2272 206/221 |
| 2014/0326731 | A1 * | 11/2014 | Raymus | A47G 19/2272 220/524 |

* cited by examiner

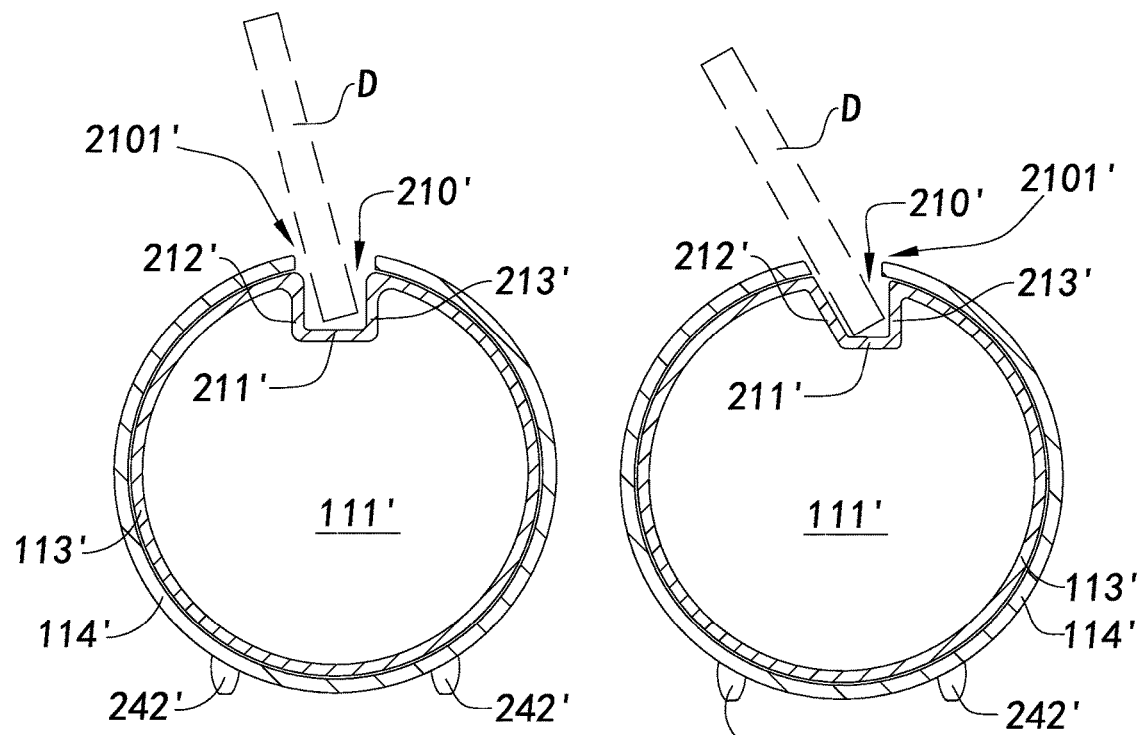
FIG. 13A
FIG. 13B
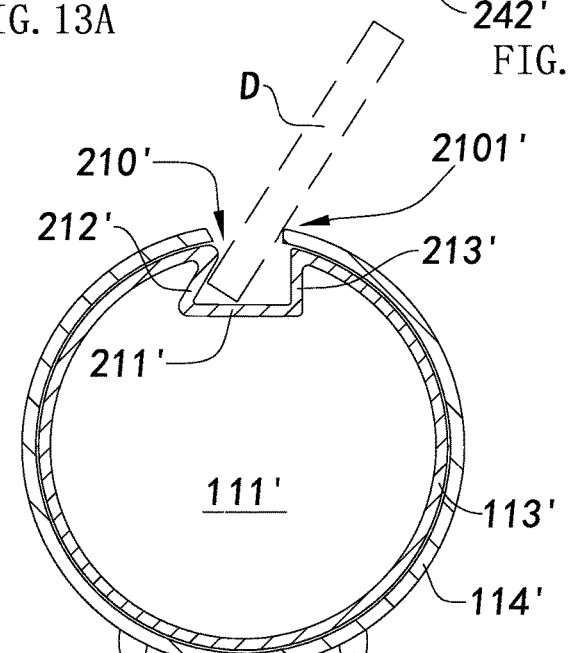
FIG. 13C

BEVERAGE BOTTLE WITH ACCESSIBLE STATION FOR PORTABLE ELECTRONIC DEVICE

CROSS REFERENCE OF RELATED APPLICATION

This is a Continuation-In-Part application that claims the benefit of priority under 35 U.S.C. §119 to a non-provisional application, application Ser. No. 14/611,274, filed Feb. 1, 2015.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a water bottle, and more particular to a beverage bottle integrated with an accessible station not only providing a window cavity for accommodating an object having an appropriate size, such as a portable electronic device, with protection feature but also allowing the user to quickly access the portable electronic device in the accessible station.

Description of Related Arts

Water is essential for the human body to function for maintaining the health and integrity of every cell in the body, wherein water plays a main role in the body to perform virtually every metabolic process. Especially for exercisers, the goal of drinking water before, during, and post-workout is to prevent dehydration and maintain performance. Therefore, almost all exercisers would like to carry their own water bottles to ensure the water quality for personal health and hygiene purpose.

More and more people are willing to go to a fitness center because there are different training-related equipments to strength different parts of the body. At the mean time, they must carry their personal items, such as keys, wallet, mobile phone, and water bottle, during workout. For convenience, they will carry a bag to store all the personal items. In addition, most of the training-related equipments provide a holder to hold the water container, such that people can drink water as they need during workout. However, some people may feel anxious that they cannot hear the phone ring when the phone is stored in the bag as an example. As a result, they will place the phone on any surface of the training-related equipment.

Cyclists, as another example, would like to carry a water bottle and an accessory, such as GPS or mobile phone during riding. Therefore, a bottle holder becomes a standard feature for most bicycles to hold the water bottle. However, the cyclists must purchase an added-on holder to hold the accessory onto the bicycle.

The common concern for the exercisers is that the mobile phone or other electronic devices cannot be well protected. Especially for the smart phone, the touch screen thereof can be easily cracked by simply dropping on the floor. Therefore, the phone should be well-protected and easy accessible during workout.

With the improvement of living standards, outdoor activities have become very popular leisure. In addition, with the development of electronic technology and mobile devices, such as mobile phones, the mobile phones have become a necessity in people's lives, so people used to carry their mobile phones everywhere.

During outdoor activities, people can play the mobile phones to greatly increase the interest during travelling, such as to use a mobile phone to play music, videos and so on. However, it is difficult to place the mobile phone in a stable position during outdoor activities. It is a burden for the user to hold a mobile device on by one hand which greatly reduces the enjoyment during activities. If the user places his/her mobile devices directly on the ground, the mobile devices will be inevitably getting dirty. In other words, while the users are watching the video on his/her mobile phones, it is convenient to have a supporting frame to support the electronic equipment, so as to make the users feel more comfortable.

There are some supporting frames specifically designed for electronic mobile device in the current market. However, it is a hassle for the users to carry these supporting frames. In addition, these supporting frames are usually small in size and seldom to use in daily life, so they are usually stored in place while they are not in use, and the users always forget where they store these supporting frames. Therefore, while the users want to use the supporting frames, they need to spend times to find the supporting frames.

SUMMARY OF THE PRESENT INVENTION

The invention is advantageous in that it provides a beverage bottle integrated with an accessible station not only providing a window cavity for accommodating an object having an appropriate size, such as a portable electronic device, keys and/or a wallet, with protection feature but also allowing the user to quickly access the portable electronic device in the accessible station.

Another advantage of the invention is to a beverage bottle with an accessible station, wherein the accessible station comprises a sheltering screen which is movable to selectively enclose the window cavity, such that the user is able to actuate the sheltering screen to access the portable electronic device.

Another advantage of the invention is to a beverage bottle with an accessible station, wherein the portable electronic device is supported at the center portion of the beverage bottle to enhance the protection of the portable electronic device.

Another advantage of the invention is to a beverage bottle with an accessible station, which further provides a power station for electrically charging the portable electronic device in the window cavity.

Another advantage of the invention is to a beverage bottle with an accessible station, wherein the beverage bottle can be held by any existing bottle holder without altering its original structure. Therefore, the user is able to carry the beverage bottle with the portable electronic device at the same time.

Additional advantages and features of the invention will become apparent from the description which follows, and may be realized by means of the instrumentalities and combinations particular point out in the appended claims.

According to the present invention, the foregoing and other objects and advantages are attained by a beverage bottle for an object, such as a portable electronic device, which comprises:

a hand-held container comprising a surrounding wall and having a fluid compartment formed within the surrounding wall; and an accessible station integrated with the hand-held container, wherein the accessible station has a window cavity for accommodating the object therein.

In accordance with another aspect of the invention, the present invention comprises a method of protecting and carrying an object, such as a portable electronic device, by a beverage bottle, which comprises the following steps.

(1) Integrate an accessible station with a hand-held container which has a fluid compartment formed within a surrounding wall of the hand-held container.

(2) Accommodate the object in a window cavity of the accessible station to protect the portable electronic device therein.

In accordance with another aspect of the invention, the present invention comprises a beverage bottle, which comprises:

a hand-held container comprising a surrounding wall and having a fluid compartment formed within the surrounding wall; and a utility base coupled with the hand-held container, wherein said utility base comprises a base casing detachably coupled at a bottom portion of said hand-held container and an audio module supported in the base casing for generating an audio output.

Another advantage of the present invention a beverage bottle with an accessible station, wherein the beverage bottle comprises a fluid compartment adapted to store water or other items, and the beverage bottle not only can provide a stable support for the portable electronic device, but also can reduce the burden on the user and provide a comfortable using experience.

Another advantage of the present invention a beverage bottle with an accessible station, wherein the beverage bottle is able to be used as a drinking water or beverage storage device, and the beverage bottle has a two-layer structure, so as to have a better thermal insulation effect to the water or beverage.

Another advantage of the present invention a beverage bottle with an accessible station, wherein the portable electronic device can be supported by the beverage bottle at a predetermined inclination angle, so that the beverage bottle not only can improve the attachment stability of the portable electronic device, but also improves the user's viewing experience.

Another advantage of the present invention a beverage bottle with an accessible station, wherein the structure of the beverage bottle is simple, not easy to be damaged, and easy to carry, so as to provide the user to carry drinking water.

Another advantage of the present invention a beverage bottle with an accessible station, wherein the beverage bottle can be used a water drinking device, and the outer wall of the hand-held container comprises a first mounting hole, which is adapted to allow the user to observe the water level inside the fluid compartment.

Another advantage of the present invention a beverage bottle with an accessible station, wherein the beverage bottle can support at least one portable electronic device, and at the same time, the beverage bottle can provide a heat diffusion function to the portable electronic device.

Another advantage of the present invention a beverage bottle with an accessible station, wherein the beverage bottle can support the portable electronic device, and at the same time, the beverage bottle further comprises a utility base adapted to install portable audio devices, rechargeable power supply, and so on.

According to the present invention, the foregoing and other objects and advantages are attained by a beverage bottle for an object, such as a portable electronic device, which comprises:

a hand-held container having a fluid compartment; and an accessible station comprising a supporting frame formed on the hand-held container to stably support at least one portable electronic device.

Preferably, the supporting frame is inwardly extended from an outer wall of the hand-held container to form a mounting groove, wherein the portable electronic device is adapted to insert into the mounting groove.

Preferably, the supporting frame comprises a bottom wall, a first sidewall, and a second sidewall, wherein the first sidewall and the second sidewall are integrally extended from the outer wall of the body unit to the bottom wall of the supporting frame, so that the mounting groove is formed between the bottom wall, the first sidewall, and the second sidewall.

Preferably, the hand-held container comprises at least one supporting leg outwardly extended from the sidewall of the hand-held container, so as to stable supported on a plane.

Preferably, the hand-held container is a cylindrical, and the mounting groove is transversely or horizontally extended from the sidewall of the hand-held container.

Preferably, the hand-held container comprises at least two front supporting leg and at least two rear supporting legs, wherein the front supporting legs are outwardly extended from the sidewall of the front end of the hand-held container, and the rear supporting legs are outwardly extended from the sidewall of the rear end of the hand-held container, and each of the outer ends of the supporting legs are in the same plane.

Preferably, the bottom wall of the supporting frame is parallel to the plane where outer ends of the supporting legs are located.

Preferably, the first sidewall is inclinedly extended from the outer wall of the hand-held container to the bottom wall of the supporting frame, so that the portable electronic device can be inclinedly supported inside the mounting groove.

Preferably, the hand-held container comprises a body unit and a spout unit, wherein the body unit defines a fluid compartment, and the body unit comprises a top fluid opening adapted to allow the fluid compartment communicating with outside. The spout unit is detachably coupled with the top fluid opening of the body unit to open and close the top fluid opening.

Preferably, the spout unit comprises a spout member and a movable cap, wherein the spout member is provided on the top fluid opening to open or close the top fluid opening. The spout member comprises a mouth piece to communicate with the top fluid opening, and the movable cap is connected with the spout member by a hinge to perform a opened position and a closed position, so that while the movable cap is in the position state, the mouth piece is covered by the movable cap, and while the movable cap is in the opened position, the mouth piece is uncovered by the movable cap.

Preferably, the front supporting legs are spacedly and outwardly extended from two ends of the cap, and when the cap is in the closed position, the outer end of the front supporting legs and the outer end of rear supporting legs are in the same plane.

Preferably, the cap comprises a snap edge integrally extended from the inner wall of the cap, wherein the snap edge is located at a position corresponding to the mouth piece, so as to effectively seal the mouth piece while the cap is in the closed position.

Preferably, the supporting frame is inwardly extended from the outer wall of the body unit, wherein the first sidewall and the second sidewall are extended from the outer wall of the body unit to the bottom wall of the supporting frame.

Preferably, the body unit comprises an inner wall and an outer wall, wherein fluid compartment is formed by the inner wall, and the outer wall is surrounding outside the inner wall.

Preferably, the supporting frame is extended from the outer wall of the body unit to the inner wall of the body unit to form a mounting hole on the outer wall, and then to form a mounting slot on the inner wall.

Preferably, the inner wall is made of a transparent material preparation, and the outer wall is made of an opaque material, so the users can view the fluid compartment of the inner wall through the mounting hole.

Preferably, the outer wall comprises a plurality of water level hole laterally extended along the sidewall of the outer wall, so that the fluid compartment can be seen through by the water level hole, so that the users can know the volume of the liquid inside the fluid compartment by the water level hole.

Preferably, one end of the water level hole is extended to the mounting hole to communicate with the mounting hole.

Preferably, the inner wall and the outer wall are respectively made of by an injection molding.

Alternatively, the supporting frame comprises a connecting plug outwardly extended from the body unit, wherein the connecting plug is adapted to insert into the connecting holes of any of the portable electronic device to fix the portable electronic device on the body unit.

Alternatively, the supporting frame comprises a retaining arm extended from the spout unit to allow the portable electronic device being mounted thereon.

Alternatively, the supporting frame comprises a bottom wall and a first sidewall, wherein the first sidewall and the bottom wall are respectively and inwardly extended from an outer wall of the body unit, and the mounting groove is formed between the bottom wall and the first sidewall. The hand-held container further comprises at least one front and rear supporting leg outwardly extended from the body unit, wherein the front supporting legs are outwardly extended from the sidewall of the front end of the hand-held container, and the rear supporting legs are outwardly extended from the sidewall of the rear end of the hand-held container, and each of the outer ends of the supporting legs are in the same plane. The bottom wall of the supporting frame is upwardly and outwardly inclined arranged with respect to a plane where the supporting legs are placed on, wherein the first sidewall is perpendicular to the bottom wall of the supporting frame.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 13A to FIG. 13C are side view of three alternative modes of the supporting frame according to the above second preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
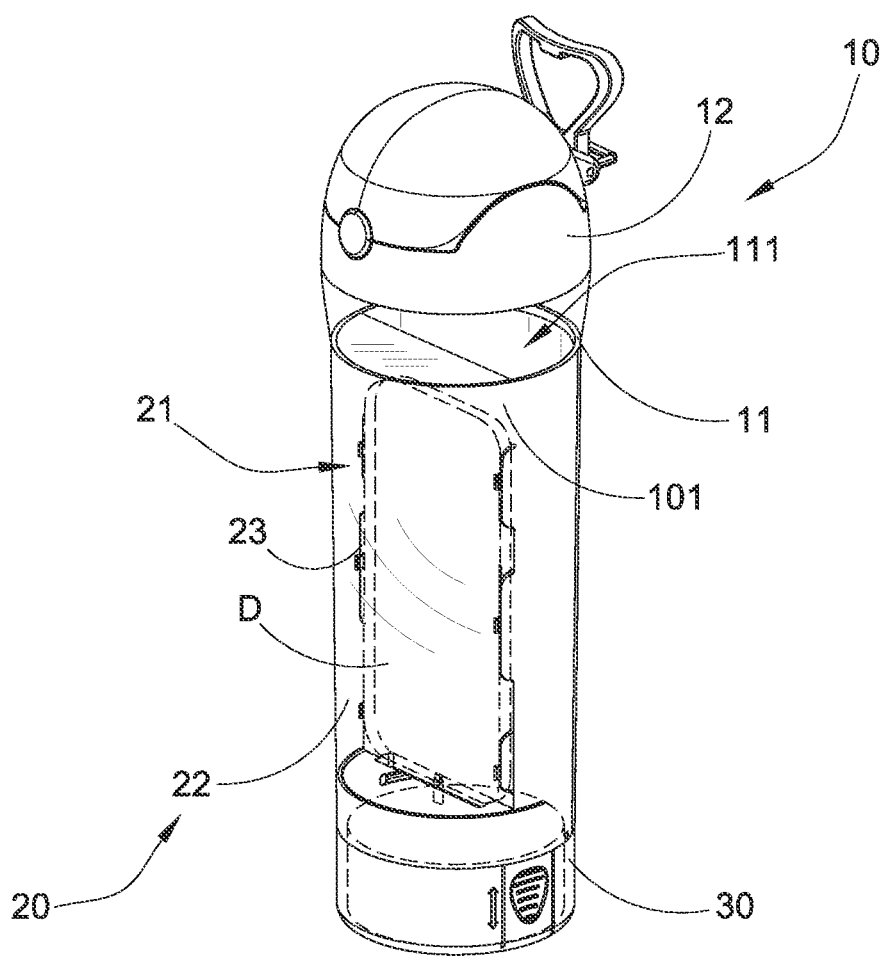
FIG. 1 is a perspective view of a beverage bottle with an accessible station for a portable electronic device according to a preferred embodiment of the present invention, illustrating the enclosed position of the sheltering screen.
Figure 2:
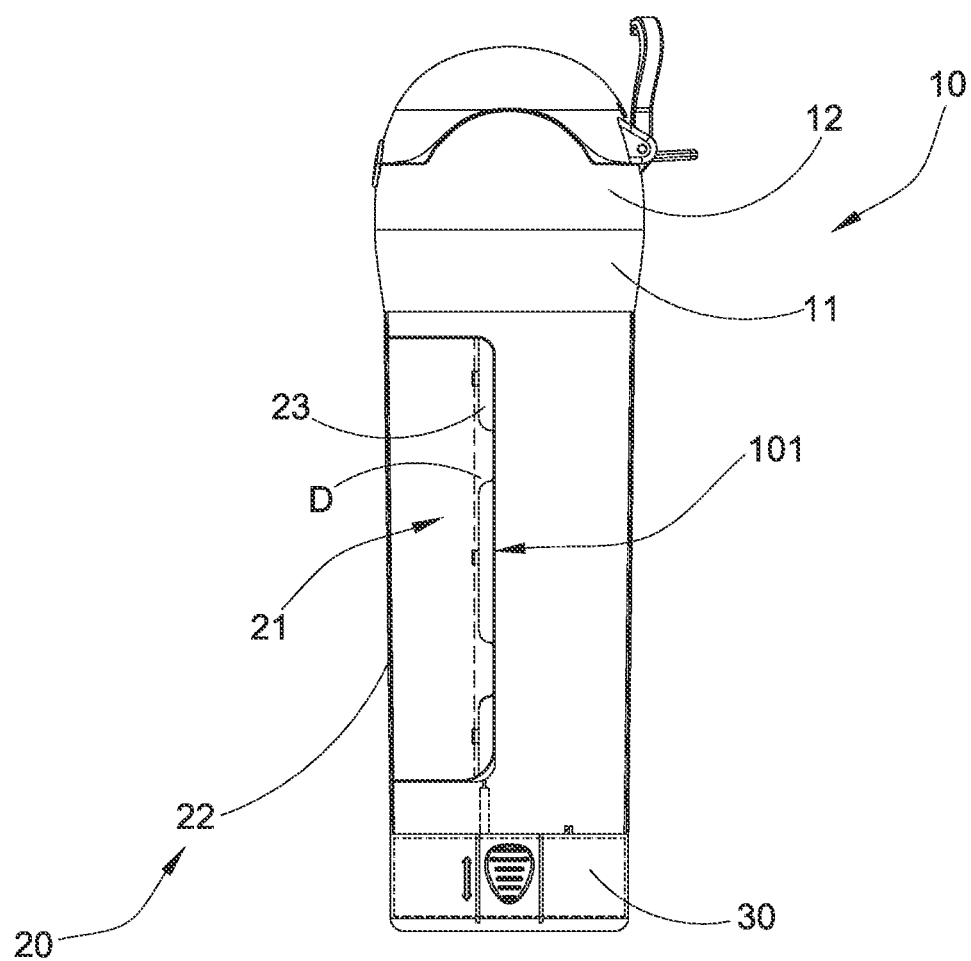
FIG. 2 is an exploded perspective view of the beverage bottle with the accessible station according to the above preferred embodiment of the present invention.
Figure 3:
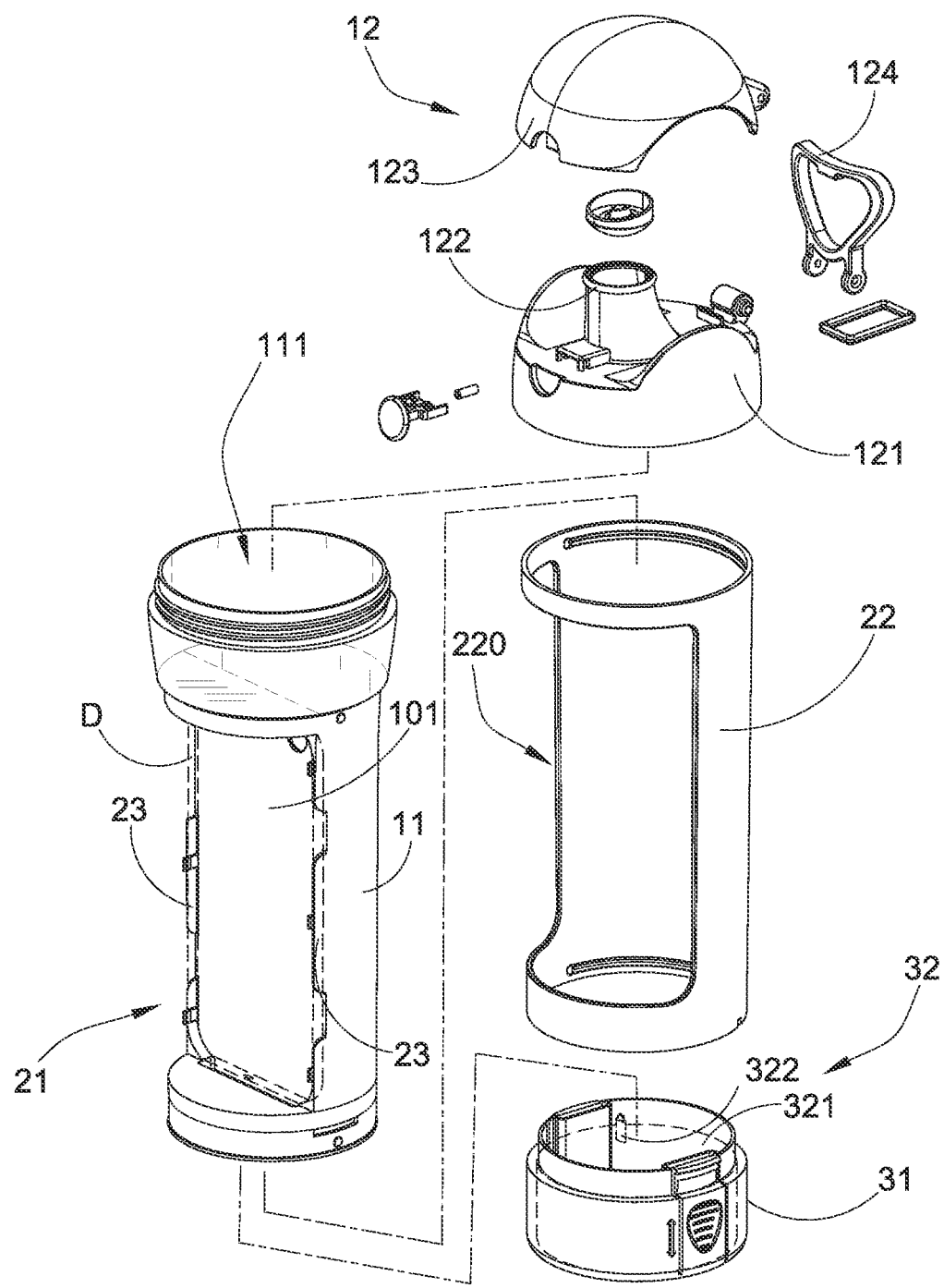
FIG. 3 is a side view of the beverage bottle with the accessible station according to the above preferred embodiment of the present invention, illustrating the portable electronic device being charged by the utility base.
Figure 4:
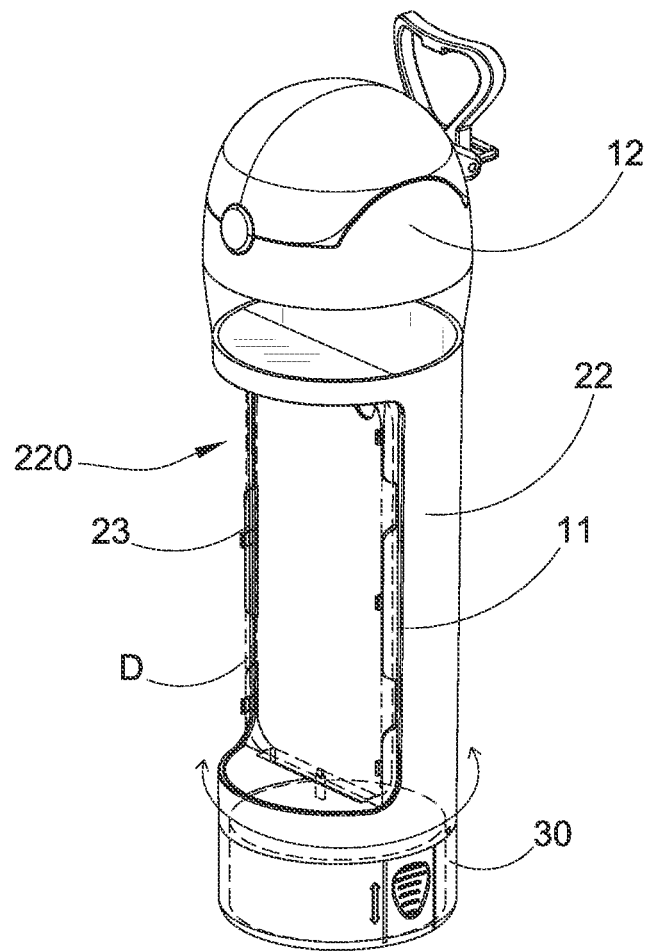
FIG. 4 is a perspective view of the beverage bottle with the accessible station according to the above preferred embodiment of the present invention, illustrating the accessible position of the sheltering screen.

Referring to FIGS. 1 to 3 of the drawings, a beverage bottle for an object having an appropriate size, such as a key, a wallet and/or a portable electronic device D, according to a preferred embodiment of the present invention is illustrated, wherein the beverage bottle comprises a hand-held container 10, an accessible station 20 integrated with the hand-held container 10, and a utility base 30. The portable electronic device D, such as a mobile phone, as an example to illustrate in the preferred embodiment to show how to protect the object in the beverage bottle. Accordingly, the accessible station 20 serves as an accessible phone station when the mobile phone is held therein.

As shown in FIGS. 1 to 3, the hand-held container 10 comprises a surrounding wall 11 and having a fluid compartment 111 formed within the surrounding wall 11, and a spout unit 12 detachably coupled with the surrounding wall 11 to communicate with the fluid compartment 111 thereof.

Accordingly, the held-held container 10 is made of safe-to-reuse and non-toxic material, such as BPA-free plastic. The surrounding wall 11 generally has a tubular configuration and defines top and bottom edges, wherein fluid compartment 11 is formed within the surrounding wall 11 with a top fluid opening, such that fluid can be filled into the fluid compartment 111 through the top fluid opening.

The spout unit 12 is detachably coupled at the top edge of the surrounding wall 11, wherein the spout unit 12 comprises spout member 121 detachably coupled with the surrounding wall 11, a mouth piece 122 upwardly extended from the spout member 121 for communicating with the fluid compartment 11, a cap 123 pivotally coupled with the spout member 121 for selectively covering the mouth piece 121, and a carrying unit 124, such as a carrying ring, extended from the spout member 121 for hanging the held-held container 10 at a fixture. Accordingly, the utility base 30 is detachably coupled at the bottom edge of the surrounding wall 11, such that the surrounding wall 11 is located between the spout unit 12 and the utility base 30.

The accessible station 20 has a window cavity 21 formed with the surrounding wall 11 of the hand-held container 10 for accommodating the portable electronic device D in the window cavity 21. Accordingly, the window cavity 21 is indented on the surrounding wall 11 of the hand-held container 10 to define a common compartment wall 101 between the window cavity 21 and the fluid compartment 111. In particular, the window cavity 21 is formed with the surrounding wall 11 between the top and bottom edges thereof, such that a window opening of the window cavity 21 faces in a radial direction of the surrounding wall 11. In other words, the fluid compartment 111 and the window cavity 21 are two individual cavities that the fluid in the fluid compartment 111 cannot enter into the window cavity 21.

According to the preferred embodiment, the accessible station 20 comprises a sheltering screen 22 movably coupled at the surrounding wall 11 to selectively enclose the window cavity 21 so as to protect the portable electronic device D therein.

The sheltering screen 22 is formed in a tubular shape having a diameter slightly larger than a diameter of the surrounding wall 11, wherein the sheltering screen 22 is coaxially and rotatably coupled with the surrounding wall 11 at a position that a top edge of the sheltering screen 22 is aligned with the top edge of the surrounding wall 11 while a bottom edge of the sheltering screen 22 is aligned with the top bottom of the surrounding wall 11. Furthermore, the sheltering screen 22 is locked by the spout unit 12 and the utility base 30 when the top and bottom edges of the surrounding wall 11 are detachably engaged with the spout unit 12 and the utility base 30 respectively, so as to prevent any sliding movement of the sheltering screen 22 along the surrounding wall 11. It is worth mentioning that a guiding groove is formed at each of the spout unit 12 and the utility base 30, wherein the top and bottom edges of the sheltering screen 22 are engaged with the guiding groove at the spout unit 12 and the utility base 30 respectively, so as to enable the sheltering screen 22 to be rotated around the surrounding wall 11.

The sheltering screen 22 has a screen opening 220 formed between the top and bottom edges thereof, wherein a size and shape of the screen opening 220 matches with the size and shape of the window opening of the window cavity 21. Therefore, the sheltering screen 22 is adapted to be rotated between an accessible position and an enclosed position. In the accessible position, the sheltering screen 22 is rotated around the surrounding wall 11 to align the screen opening 220 with the window cavity 21, such that the user is able to access the portable electronic device D through the screen opening 220. In the enclosed position, the sheltering screen 22 is rotated around the surrounding wall 11 to misalign the screen opening 220 with the window cavity 21, such that the portable electronic device D is enclosed within the window cavity 21 and protected by the sheltering screen 22.

Preferably, the sheltering screen 22 is made of transparent and rigid material, such that the portable electronic device D can be seen through the sheltering screen 22 in the enclosed position. The curvature of the sheltering screen 22 matches with the curvature of the surrounding wall 11, such that the sheltering screen 22 further serves as a convex lens for enlarging the screen of the portable electronic device D. Therefore, the user is able to quickly access the mobile phone as an example by rotating the sheltering screen 22 in the accessible position. After using the mobile phone, the user is able to quickly close the window cavity 21 by rotating the sheltering screen 22 back to the enclosed position. It is worth mentioning that the portable electronic device D is received at a center portion of the surrounding wall 11 and within the window cavity 21, the portable electronic device D will be located at the center of mass of the hand-held container 10 so as to enhance the protection of the portable electronic device D by the surrounding wall 11 and the sheltering screen 22. In addition, when the fluid is filled in the fluid compartment 111, the fluid will also become excellent shock absorption medium for absorbing shock when the hand-held container 10 is dropped on the floor.

In order to securely support the portable electronic device D within the window cavity 21, the accessible station 20 further comprises a plurality of holder units 23 spacedly formed in the window cavity 21 for detachably holding the portable electronic device D in position. Preferably, the holder units 23 are edge holders spacedly formed at two side edges of the window cavity 21, i.e. the common compartment wall 101, for detachably holding two side edges of the portable electronic device D. It is appreciated that when the mobile phone is supported in the window cavity 21 via the holder units 23, a touch screen of the mobile phone is facing toward the window opening of the window cavity 21. In other words, the user is able to access the touch screen of the mobile phone by rotating the sheltering screen 22 in the accessible position without taking the mobile phone out of the window cavity 21.

It is worth mentioning that the diameter size of the hand-held container 10 is the same as the diameter size of the existing water bottle, such that the beverage container of the present invention can be held by any existing bottle holder.

As shown in FIGS. 1 to 3, the utility base 30 comprises a base casing 31 detachably coupled at a bottom portion of the hand-held container 10 and a power source unit 32 supported in the base casing 31 for electrically connecting to the portable electronic device D within the window cavity 21. Accordingly, the base casing 31 is detachably coupled at the bottom edge of the surrounding wall 11 to lock up the sheltering screen 22 that the sheltering screen 22 is only allowed to be rotated around the surrounding wall 11. The base casing 31 has two quick releasing clipping arms detachably coupled with the bottom edge of the surrounding wall 11.

The power source unit 32 comprises a rechargeable battery 321 disposed in the base casing 31 and a charging terminal 322 upwardly and operatively extended from the rechargeable battery 321 through a bottom wall of the window cavity 21 for electrically connecting with a charging port of the portable electronic device D. Therefore, the portable electronic device D can be protected within the window cavity 21 and can be charged by the power source unit 32 at the same time, so as to prevent the portable electronic device D being out of battery during workout. Preferably, the charging terminal 322 of the power source unit 32 is a USB interface.

The power source unit 32 further comprises a recharging port 323 provided at the base casing 31 for charging the rechargeable battery 321 via a power charging cable to a power outlet. The power source unit 32 further comprises a power indicator 324 provided at the base casing 31 for indicating the power status of the rechargeable battery 321, such as charging status and low-power warning status.

Figure 10:
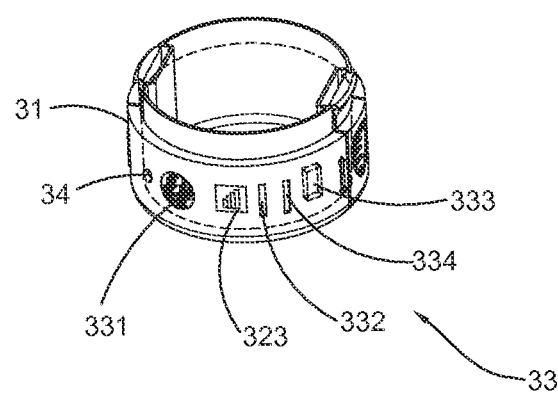
FIG. 10 is a modification of the utility base of the beverage bottle according to the above preferred embodiment of the present invention.

Accordingly, the power indicator 324 is embodied as a power displaying element electrically connected with the rechargeable battery 321 of the power source unit 32 for displaying the electrical power stored in the rechargeable battery 321, as shown in FIG. 10. It is worth mentioning that the power indicator 324 may be a power indicating lamp or a power display screen capable of displaying the electrical power stored in the rechargeable battery 321 or the percentage ratio of the reserved charge to the full charge of the rechargeable battery 321. It is apparent to these skilled in the art that the power indicator 324 may be any other displaying members capable of displaying the electrical power stored in the rechargeable battery 321.

It is appreciated that a replaceable battery or the like can be received in the base casing 31 instead of the rechargeable battery 321 for charging the portable electronic device D. Preferably, the rechargeable battery 321 has a predetermined weight applied at the bottom portion of the beverage container to stabilize the beverage container when the beverage container is supported on a surface in an upright manner.

Furthermore, the utility base 30 comprises an audio module 33 provided at the outer surface of the base casing 31 for operatively linking to an audio inlet of the portable electronic device D in the window cavity 21. Therefore, the user is able to listen to the music or answer the phone via an audio cable connecting to the audio module 33.

As shown in FIG. 10, the utility base 30 is modified that the audio module 33 is supported in the base casing 321, wherein the audio module 33 comprises at least a speaker 331, an audio input 332 provided in an outer side of the base casing 31 and/or a signal receiving module 333 being capable of receiving wireless audio signal, wherein the audio input 332 and the signal receiving module 333 are electrically connected with the speaker 331. More preferably, the audio module 33 further comprises an audio interface 334 provided in the base casing 31, wherein the audio interface 334 is extended to the accessible station 20, such that the portable electronic device D may be electrically connected to the audio interface 334. The audio interface 334 is electrically connected with the speaker 331 such that the portable electronic device D is able to provide audio signal for the audio module 33 via the audio interface 334. It is appreciate that each of the audio input 332 and the audio interface 334 may be a RCA analog audio interface, a S/PDIF audio interface, a Digital a Coaxial audio interface, an optical fiber audio interface, a balance simulator audio interface such as XLR audio interface or combination thereof. Each of the audio input 332 and the audio interface 334 may be any other interface capable of achieving the audio signal input/output function, for example USB interface. Preferably, the audio module 33 comprises at least an adjusting and controlling button for achieving the control function of adjusting output volume, selecting play a playlist and/power control.

As shown in FIG. 3, the utility base 30 further comprises a lighting unit 34 disposed at the bottom of the base casing 31 and electrically linked to the rechargeable battery 321. The lighting unit 34, such as a flashlight unit, comprises a plurality of light sources, such as LEDs on a circuit board, supported on a bottom wall of the base casing 31 and electrically linked to the power source unit 32. Preferably, the lighting unit 34 is electrically linked to the rechargeable battery 321 so as to provide electrical power to the lighting unit 34. When the light sources are activated for generating illumination light, the light can pass through the bottom wall of the base casing 31. It is worth mentioning that the bottom wall of the base casing 31 is transparent.

The utility base 30 further comprises a control panel 35 provided at the base casing 31 for selectively controlling operations of the lighting unit 34 and the portable electronic device D. Accordingly, the control panel 35 comprises a light operating switch 351 operatively linked to the lighting unit 34 to control the lighting unit 34 in an on-and-off manner. The control panel 35 further comprises a device control switch 352 operatively linked to the portable electronic device D when the portable electronic device D is operatively connected to the charging terminal 322. For example, the device control switch 352 can selectively control the audio volume and song selection of the portable electronic device D. Preferably, the power indicator 324 is incorporated with the control panel 35 that an integrated circuitry is formed to control the power source unit 32, the lighting unit 34, and the portable electronic device D.

Figure 5:
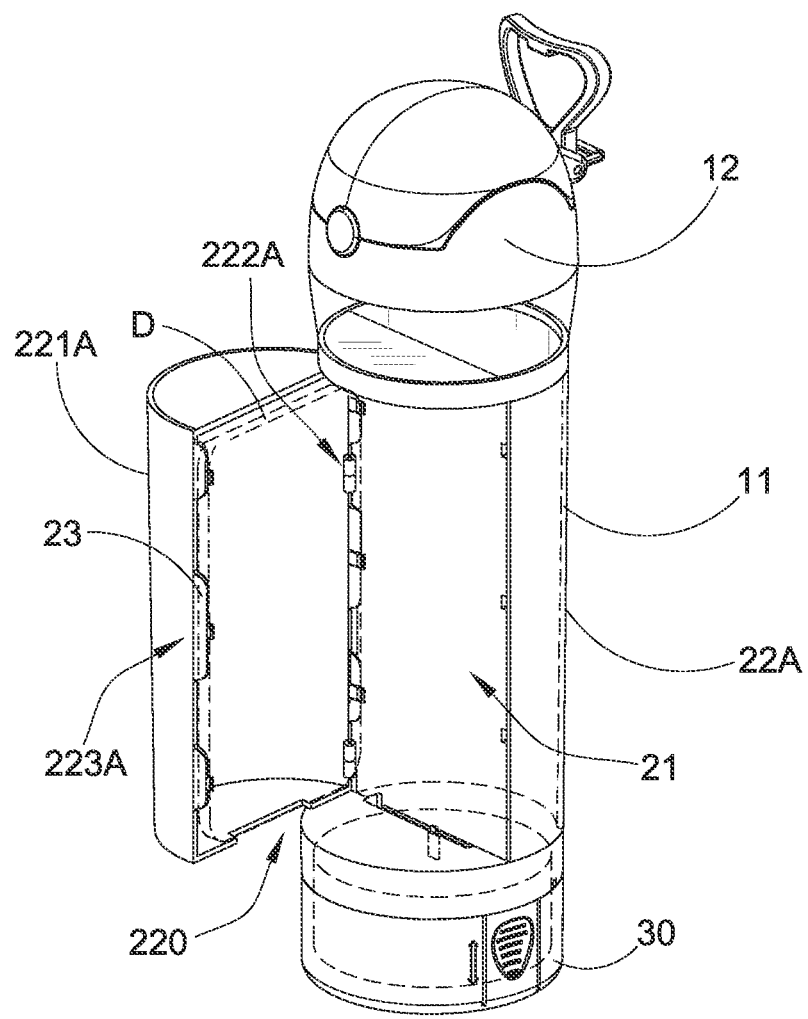
FIG. 5 illustrates a first modification of the sheltering screen of the accessible station according to the above preferred embodiment of the present invention.

FIG. 5 illustrates a first modification of the beverage container, wherein the sheltering screen 22A is pivotally moved with respect to the surrounding wall 11 to selectively enclose the window cavity 21. In other words, the sheltering screen 22A is locked by the spout unit 12 and the utility base 30 to prevent a rotational movement of the sheltering screen 22A with respect to the surrounding wall 11.

In particular, the sheltering screen 22A comprises a screen door 221A having a pivotal side edge 222A pivotally provided along a first side edge of the window cavity 21, and an opposed lockable side edge 223A releasably locked at an opposed second side edge of the window cavity 21. Therefore, the screen door 221A can be pivotally and sidewardly opened to expose the window cavity 21 for the user to access the portable electronic device D therein.

Accordingly, the pivotal side edge 222A of the screen door 221A is pivotally coupled at one side edge of the screen opening 220 which aligns with the first side edge of the window cavity 21. The lockable side edge 223A releasably locked at an opposed side edge of the screen opening 220 which aligns with the second side edge of the window cavity 21. Since the sheltering screen 22A cannot be rotated around the surrounding wall 11, the screen door 221A will always align with the window cavity 21.

As shown in FIG. 5, the holder units 23 are spacedly provided at an inner side of the sheltering screen 22A for detachably holding the portable electronic device D in position. In particular, the holder units 23 are provided at the inner side of the screen door 221A, such that when the screen door 221A is moved to open the window screen 21, the portable electronic device D is automatically removed out of the window screen 21, and when the screen door 221A is moved to close the window screen 21, the portable electronic device D is automatically received in the window screen 21.

Accordingly, the screen door 221A can be configured in a curved shape to match the curvature of the screen door 221A with the curvature of the surrounding wall 11, such that when the screen door 221A is pivotally moved to close the window cavity 21, the surrounding wall 11 and the screen door 221A form a circular cross section.

Figure 6:
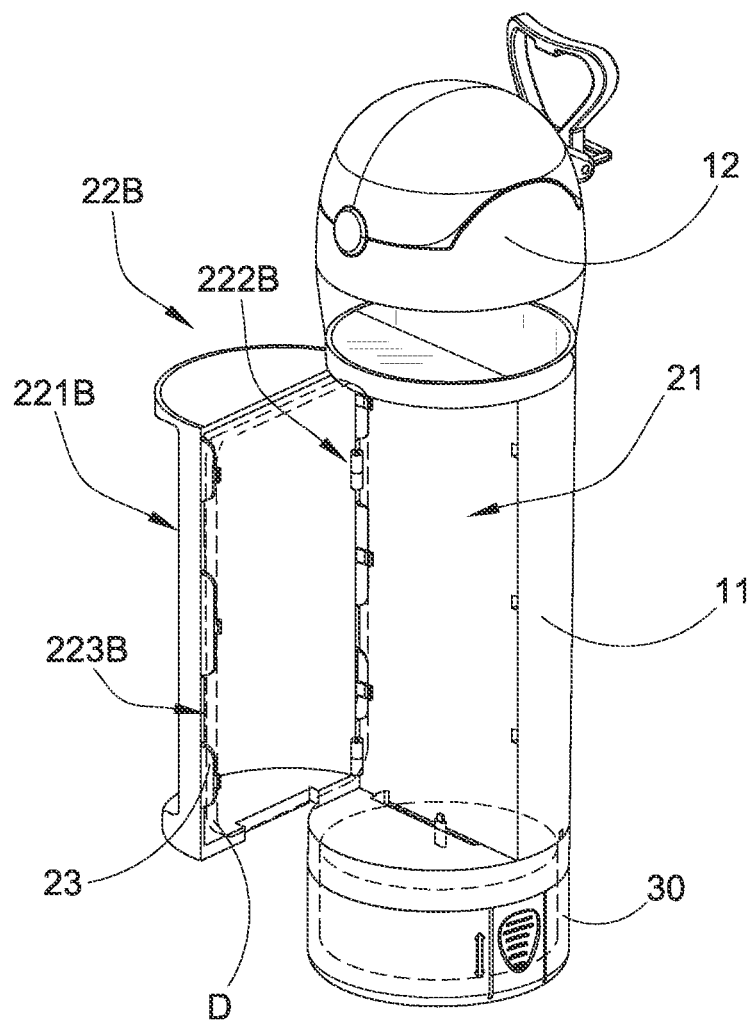
FIG. 6 illustrates the flat transparent screen of the first modification the sheltering screen of the accessible station according to the above preferred embodiment of the present invention.

Alternatively, the screen door 221B can be a flat transparent screen made of touch response material, such as tempered glass, and is arranged for overlapping on the touch screen of the portable electronic device D, as shown in FIG. 6. Therefore, the user is able to directly access the touch screen of the portable electronic device D without opening the screen door 221B.

It is appreciated that the screen door 221B can be directly coupled at the surrounding wall 11. In other words, the pivotal side edge 222B of the screen door 221B is pivotally coupled at the surrounding wall 11 along the first side edge of the window cavity 21 while the lockable side edge 223B releasably locked at the surrounding wall 11 along the second side edge of the window cavity 21. Therefore, the sheltering screen 22B is formed as the screen door 221B without encircling the surrounding wall 11, so as to reduce the material cost of the sheltering screen 22B, as shown in FIG. 6.

Figure 7:
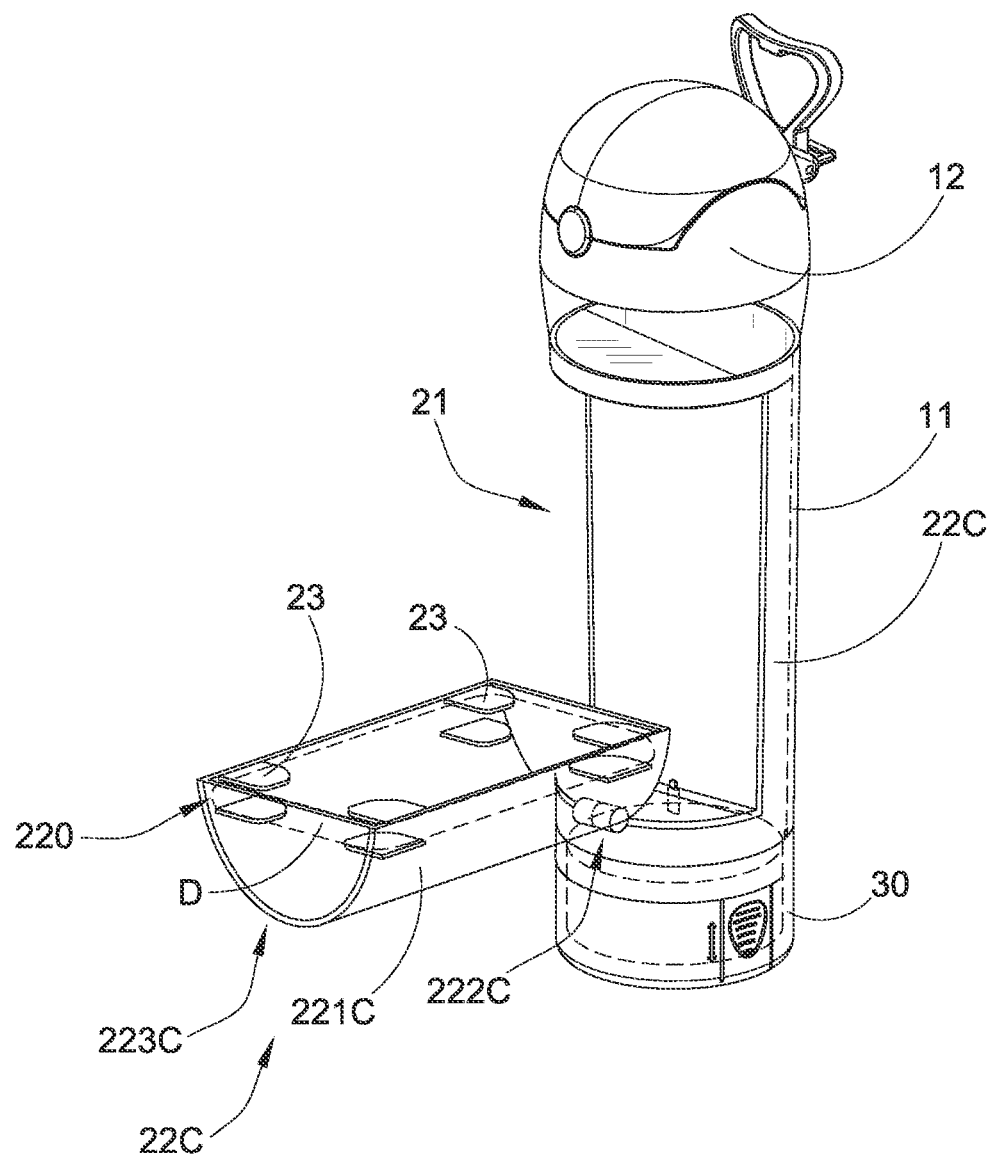
FIG. 7 illustrates a second modification of the sheltering screen of the accessible station according to the above preferred embodiment of the present invention.

FIG. 7 illustrates a second modification of the beverage container, wherein the sheltering screen 22C comprises a screen door 221C having a pivotal bottom edge 222C pivotally provided along a bottom edge of the window cavity 21, and an opposed lockable top edge 223C releasably locked at a top edge of the window cavity 21. Therefore, the screen door 221C can be pivotally and downwardly opened to expose the window cavity 21 for the user to access the portable electronic device D therein.

Accordingly, the pivotal side edge 222C of the screen door 221C is pivotally coupled at a bottom edge of the screen opening 220 which aligns with the bottom edge of the window cavity 21. The lockable side edge 223C releasably locked at a top edge of the screen opening 220 which aligns with the top edge of the window cavity 21. Since the sheltering screen 22C cannot be rotated around the surrounding wall 11, the screen door 221C will always align with the window cavity 21.

Likewise, the holder units 23 are spacedly provided at an inner side of the sheltering screen 22C for detachably holding the portable electronic device D in position. In particular, the holder units 23 are provided at the inner side of the screen door 221C, such that when the screen door 221C is moved to open the window screen 21, the portable electronic device D is automatically removed out of the window screen 21, and when the screen door 221C is moved to close the window screen 21, the portable electronic device D is automatically received in the window screen 21.

Accordingly, the screen door 221C can be configured in a curved shape to match the curvature of the screen door 221C with the curvature of the surrounding wall 11, such that when the screen door 221C is pivotally moved to close the window cavity 21, the surrounding wall 11 and the screen door 221C form a circular cross section.

Figure 8:
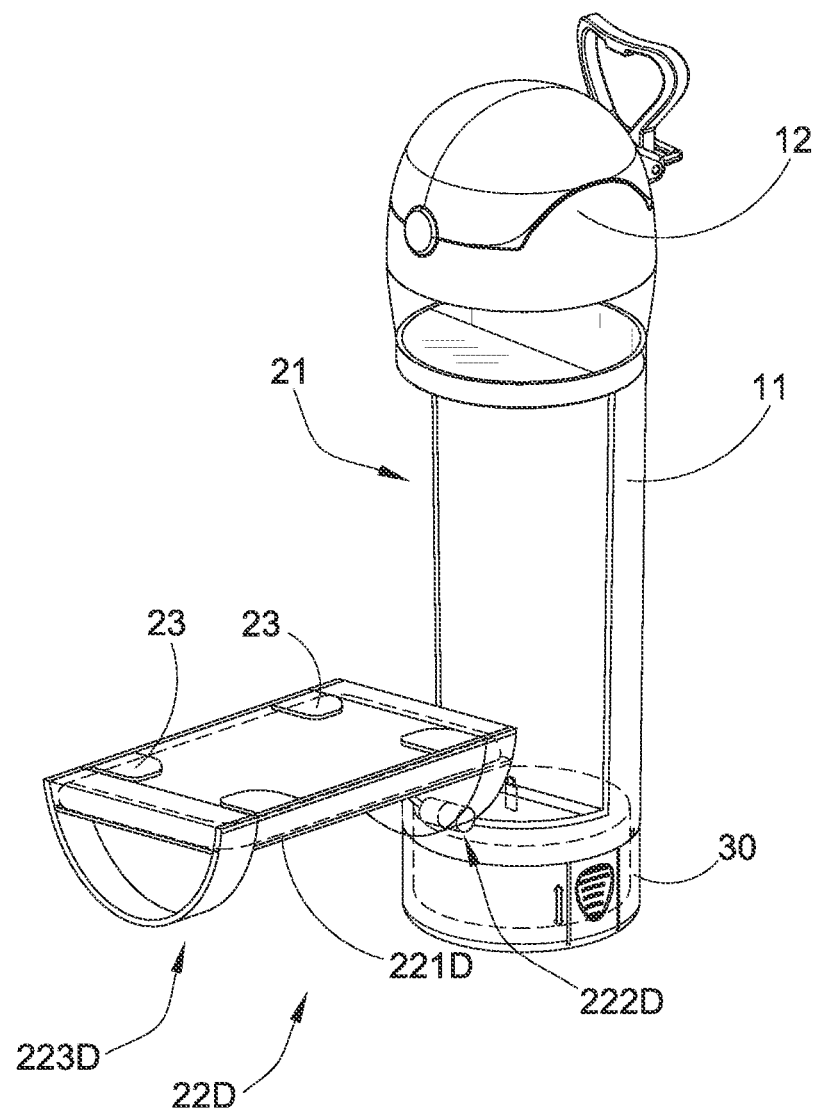
FIG. 8 illustrates the flat transparent screen of the second modification of the sheltering screen of the accessible station according to the above preferred embodiment of the present invention.

Alternatively, the screen door 221D can be a flat transparent screen made of touch response material, such as tempered glass, and is arranged for overlapping on the touch screen of the portable electronic device D, as shown in FIG. 8. Therefore, the user is able to directly access the touch screen of the portable electronic device D without opening the screen door 221D.

It is appreciated that the screen door 221D can be directly coupled at the surrounding wall 11. In other words, the pivotal bottom edge 222D of the screen door 221D is pivotally coupled at the surrounding wall 11 along the bottom edge of the window cavity 21 while the lockable top edge 223D releasably locked at the surrounding wall 11 along the top edge of the window cavity 21. Therefore, the sheltering screen 22D is formed as the screen door 22D without encircling the surrounding wall 11, so as to reduce the material cost of the sheltering screen 22D.

Figure 9:
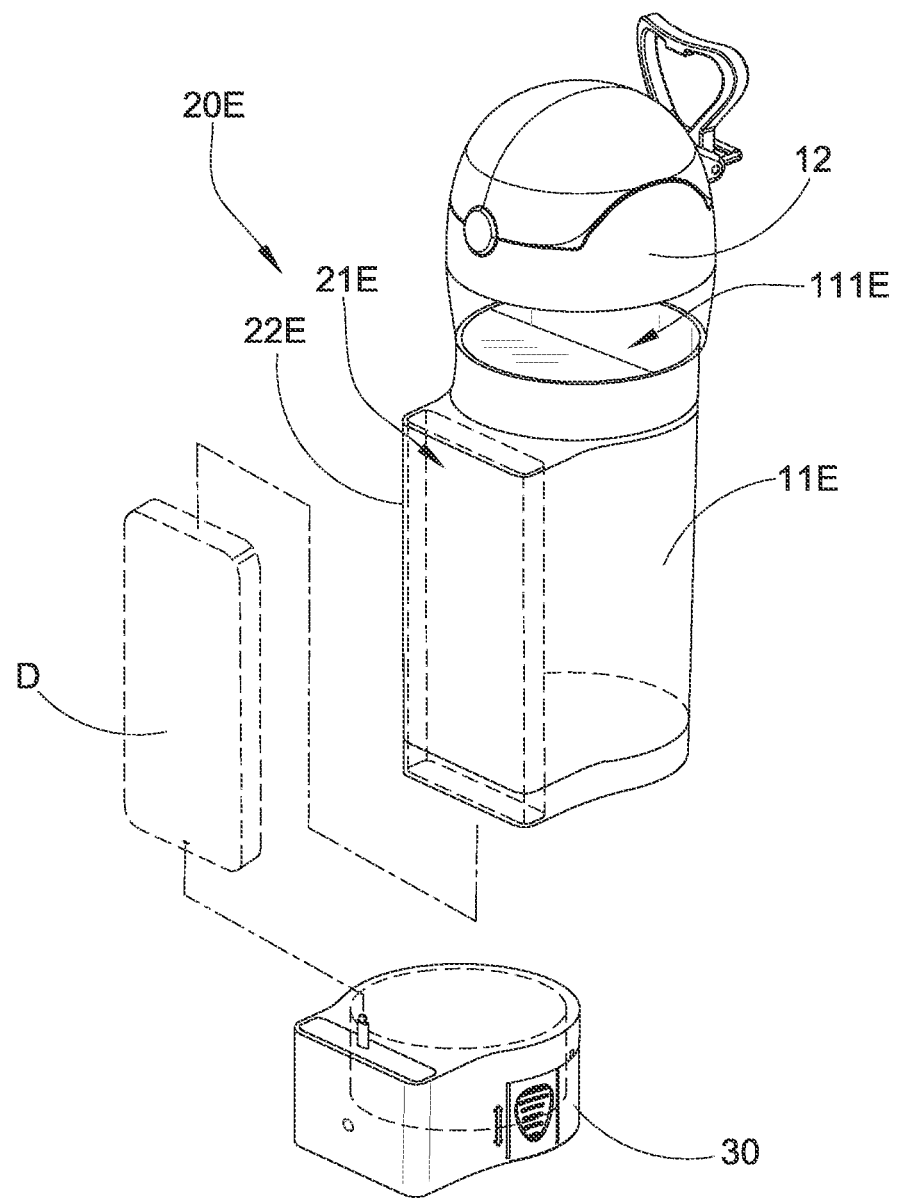
FIG. 9 illustrates a third modification of the sheltering screen of the accessible station according to the above preferred embodiment of the present invention.

FIG. 9 illustrates an alternative mode of the accessible station 20E which comprises a sheltering screen 22E protruded from the surrounding wall 11E at a position that a portion of the surrounding wall 11E forms a common compartment wall between the window cavity 21E and the fluid compartment 111E, such that the window cavity 21E is formed between the sheltering screen 22E and the surrounding wall 11E.

Accordingly, the window cavity 21E has an elongated bottom opening to align with the bottom edge of the surrounding wall 11E, such that the portable electronic device D is slidably received in the window cavity 21E through the bottom opening. In addition, the utility base 30E is detachably coupled at the bottom edge of the surrounding wall 11E to cover the bottom opening so as to enclose the window cavity 21E. In order to remove the portable electronic device D from the window cavity 21E, the utility base 30E can be detached from the surrounding wall 11E, such that the portable electronic device D can be slid out of the window cavity 21E through the bottom opening thereof. Preferably, a cushioning layer is provided at a ceiling of the window cavity 21E to prevent any unwanted movement of the portable electronic device D within the window cavity 21E. Preferably, the sheltering screen 22E is a flat transparent screen made of touch response material and is arranged for overlapping on the touch screen of the portable electronic device D. Therefore, the user is able to directly access the touch screen of the portable electronic device D without taking the portable electronic device D out of the window cavity 21E.

Accordingly, the present invention further provides a method of protecting and carrying a portable electronic device D by the beverage bottle, which comprises the following steps.

(1) Integrate the accessible station 20 with the hand-held container 10 to form the fluid compartment 111 and the window cavity 21.

(2) Accommodate the portable electronic device D in the window cavity 21 of the accessible station 21 to protect the portable electronic device D therein.

(3) Move the sheltering screen 22 to selectively enclose the portable electronic device D in the window cavity 21.

In the step (3), the sheltering screen 22 can be moved by rotating the sheltering screen 22 around the surrounding wall 1 to open up the window cavity 21 when the screen opening 22 is aligned therewith. The screen door 221A, 221B of the sheltering screen 22A, 22B can be pivotally opened sideward to open up the window cavity 21. The screen door 221C, 221D of the sheltering screen 22C, 22D can be pivotally opened downward to open up the window cavity 21. Alternatively, the touch screen of the portable electronic device D can be directly accessed through the sheltering screen 22 without taking the portable electronic device D out of the window cavity 21.

The present invention provides a beverage bottle for storing and supporting a mobile device. The mobile device can be a mobile phone, tablet PCs, MP3 players, MP4 players and other handheld electronic devices, wherein the handheld electronic devices are usually direct held by the users, so and the mobile devices usually have no built-in supporting assemble, such that they may not be stably stand on a flat surface. According to the present invention, the beverage bottle can provide to support the mobile devices standing on the flat surface, and allow the display screen of the mobile device being shown to the users at a predetermined angle, so that the users can comfortably watch the display screen of the mobile devices.

The beverage bottle comprises a hand-held container 10' having a fluid compartment 111' to provide storing space for the beverage bottle. In addition, the beverage bottle further comprises a supporting frame 21' formed within the hand-held container 10' and adapted to stably support the at least one mobile device.

The fluid compartment 111' is adapted to store beverage for the user to drink. In most situations, the fluid compartment 111' is adapted to store water, such that hand-held container 10' is used to be a water cup during our daily life.

The fluid compartment 111' is formed within the hand-held container 10', wherein the beverage bottle has both of the functions of storing and supporting so as to solve the problems mentioned in the background. When the users are doing the outdoor activities, the water cups are essential products, so the users have no additional burden to carry the beverage bottle with water storing function as well as that the beverage bottle can be a stable supporting frame for the mobile device, so as to greatly improve the user's leisure experience. Therefore, the beverage bottle of the present invention is a multiple function container, so as to greatly enhance the product's value.

It is worth mentioning that the beverage bottle may also be used for storing the mobile device accessory, such as a mobile device headset, rechargeable batteries and other devices. These mobile device accessories usually stored into the luggage and hard to find, and these mobile device accessories are easily damaged by any external force applied to the luggage. Therefore, if these mobile device accessories are stored into the beverage bottle, it is not only convenience for the user to find the mobile device accessories, but also can protect these mobile device accessories being damaged.

Figure 11:
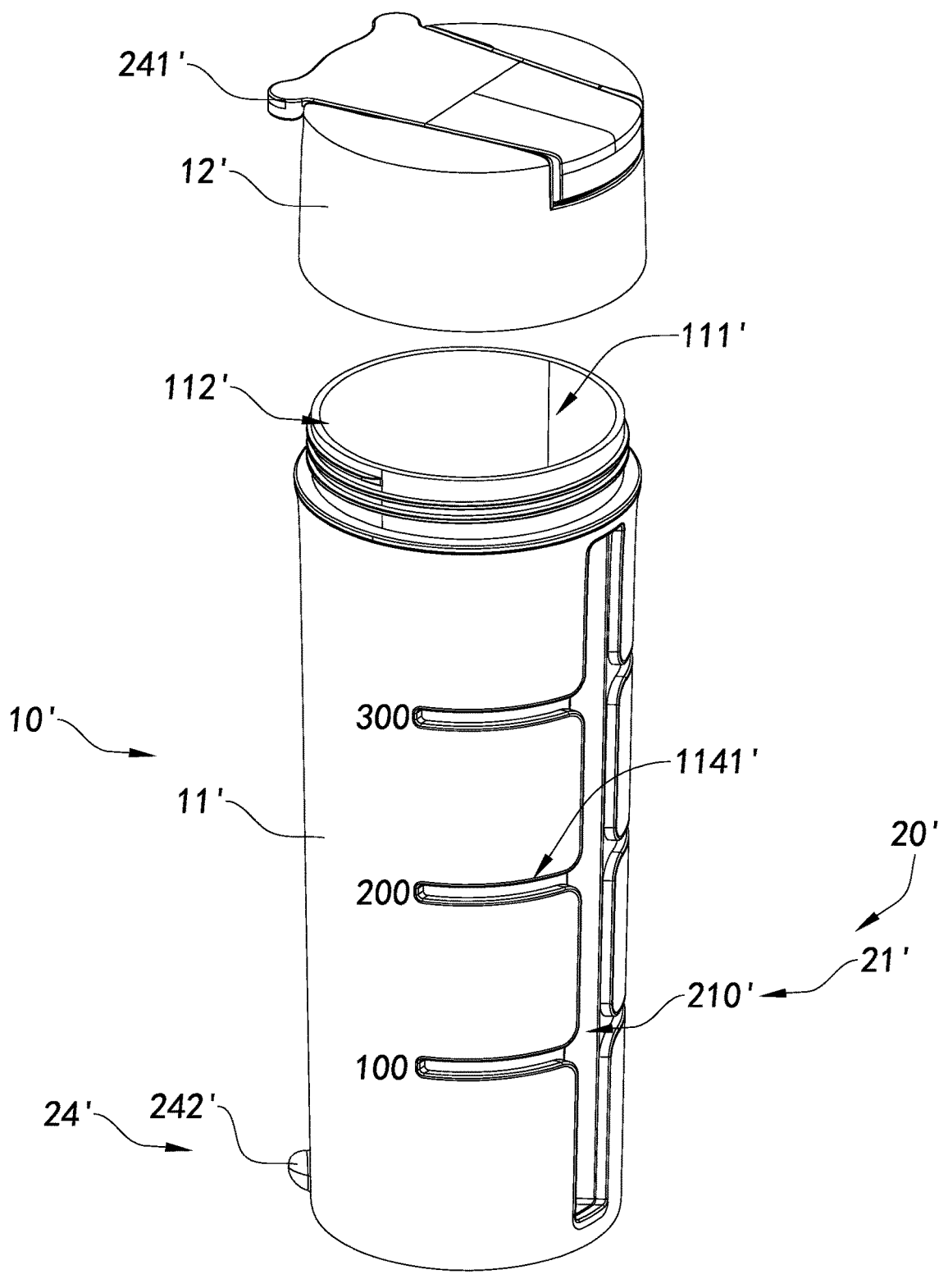
FIG. 11 is a perspective view of a beverage bottle with an accessible station for a portable electronic device according to a second preferred embodiment of the present invention.
Figure 12:
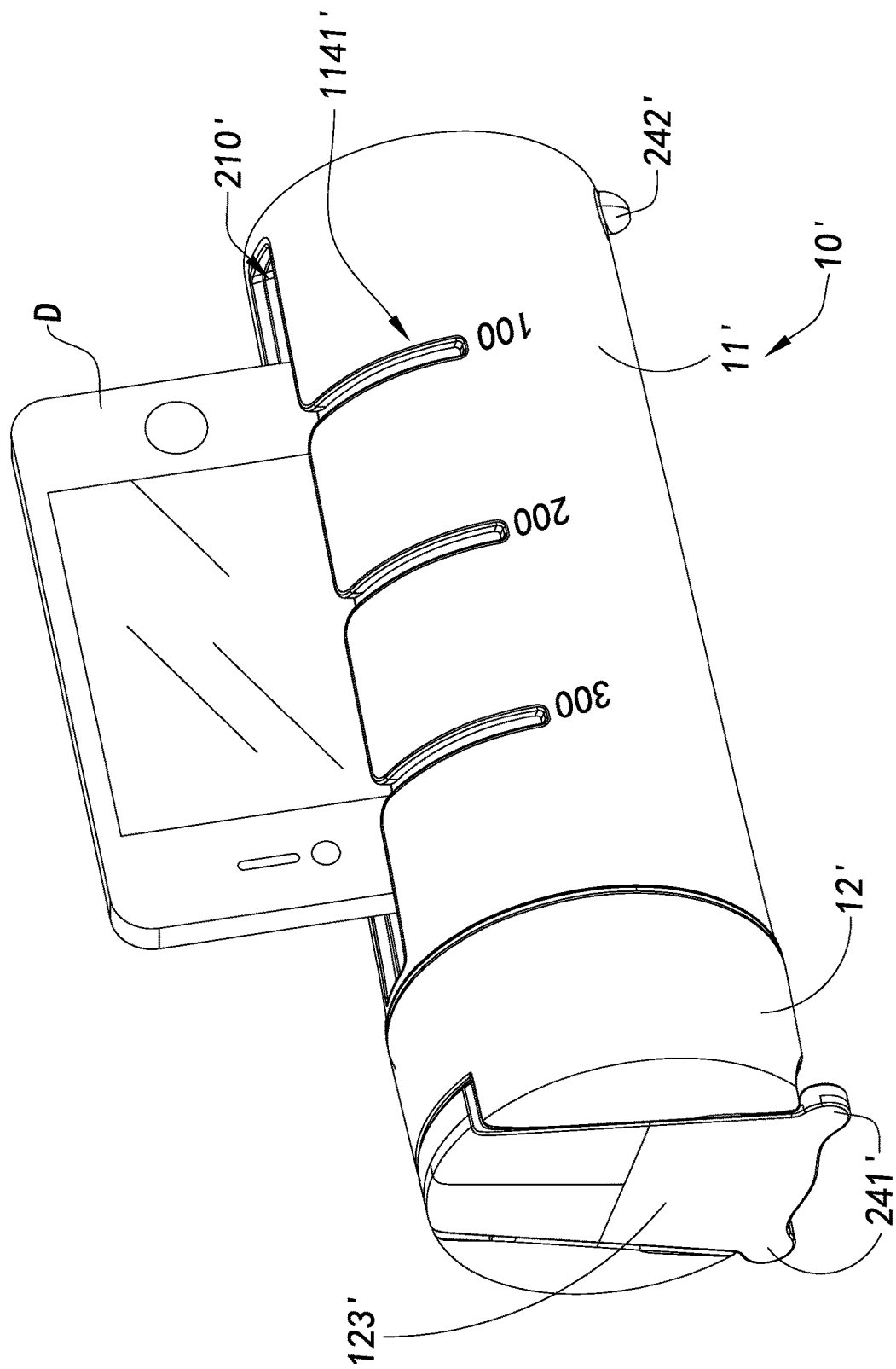
FIG. 12 is a perspective view of the beverage bottle with the accessible station according to the above second preferred embodiment of the present invention, illustrating the portable electronic device being mounted on the mounting groove.

Referring to FIG. 11 to FIG. 12 of the drawings, a beverage bottle according to a second preferred embodiment of the present invention is illustrated, wherein the beverage bottle comprises a hand-held container 10'.

The hand-held container 10' comprises a body unit 11' and a spout unit 12', wherein the body unit 11' defines a fluid compartment 111' adapted to store water or other items, and the body unit 11' comprises a top fluid opening 112' adapted to allow the fluid compartment 111' communicating with outside. The spout unit 12' is detachably coupled with the top fluid opening 112' of the body unit 11' and is adapted to open and close the top fluid opening 112'. In other words, the spout unit 12' is adapted to open and close the fluid compartment 111' of the body unit 11'.

Accordingly, the hand-held container 10' further comprises an accessible station 20', wherein the accessible station 20' comprises a supporting frame 21' having a mounting groove 210' to stably support a portable electronic device D, so as to allow a display screen of the portable electronic device D being displayed at a predetermined angle. The mounting groove 210' is inwardly indented on an outer wall of the hand-held container 10'.

Preferably, the supporting frame 21' is formed on the body unit 11', wherein the mounting groove 210' is inwardly indented on the outer surface of the body unit 11', and an edge portion of the portable electronic device D can be inserted into the mounting groove 210', such that the portable electronic device D can be securely supported at a stable position by the supporting frame 21'.

Referring to FIG. 13A to FIG. 13C of the drawings, the supporting frame 21' comprises a bottom wall 211', a first sidewall 212', and a second sidewall 213', wherein the first sidewall 212' and the second sidewall 213' are integrally extended from the outer wall of the body unit 11' to the bottom wall 211' of the supporting frame 21', so that the mounting groove 210' is formed among the bottom wall 211', the first sidewall 212', and the second sidewall 213'. When the edge portion of the portable electronic device D is inserted into the mounting groove 210', the bottom wall 211' of the supporting frame 21' is adapted to support a bottom wall of the portable electronic device D, and two sidewalls of the portable electronic device D are supported by the first and second sidewall 212', 213' of the supporting frame 21'. In other words, the bottom wall and two sidewalls of the portable electronic device D can be stably supported by the supporting frame 21', so the portable electronic device D cannot be easily removed. It is worth mentioning that a width of the mounting groove 210', i.e. a distance between the first sidewall 212' and the second sidewall 213', is larger than a thickness of the portable electronic device D.

As shown in FIG. 13A to FIG. 13C, three alternative modes of the supporting frame 21' are provided according to the above preferred embodiment of the present invention, and the supporting frame 21' is included but not limited to the following embodiment.

As shown in FIG. 13A, the first sidewall 212' and the second sidewall 213' are parallel with each other, and the first sidewall 212' and the second sidewall 213' are both perpendicular with the bottom wall 211'. That is to say, the first sidewall 212' and the second sidewall 213' are perpendicularly extended from the bottom wall 211'. In other words, the angle between the first sidewall 212' and the bottom wall 211' is a right angle. In addition, the thickness of the portable electronic device D is slightly smaller than the distance of the first sidewall 212' and the second sidewall 213', such that the portable electronic device D can be kept almost perpendicularly between the first sidewall 212' and the second sidewall 213'. At the same time, the portable electronic device D is contacted with the bottom wall 211', the first sidewall 212' and the second sidewall 213' of the supporting frame 21', so as to securely support the portable electronic device D. When thickness of the portable electronic device D is smaller than the distance between the first sidewall 212' and the second sidewall 212', the portable electronic device D may be obliquely inserted into the mounting groove 210', such that the inclination angle of the portable electronic device D will be increased with respect to the vertical orientation thereof. When the portable electronic device D is contacted with the bottom wall 211', the first sidewall 212' and the second sidewall 213' of the supporting wall 21' in a line contact. As a result, the portable electronic device D can be stably supported by the supporting frame 21'.

As shown in FIG. 13B and FIG. 13C, the first sidewall 212' and the second sidewall 213' are not parallelly arranged, such that the first sidewall 212' is not perpendicular to the bottom wall 211', and the second sidewall 213' is perpendicular to the bottom wall 211'. In other words, the first sidewall 212' is inclinedly extended from the outer wall of the body unit 21' to the bottom wall 211', and the second sidewall 213' is perpendicularly extended from the outer wall of the body unit 21' to the bottom wall 211'. As shown in FIG. 13B, the angle between the first sidewall 212' and the bottom wall 211' is an obtuse angle, wherein the first sidewall 212' enlarges a contacting area to contact with the edge portion of the portable electronic device D. As shown in 13C, the angle between the first sidewall 212' and the bottom wall 211' is an acute angle, wherein the first sidewall 212' can lock up the edge portion of the portable electronic device D.

The portable electronic device D can be obliquely inserted into the mounting groove 210' along the first sidewall 212' is obliquely inserted into the mounting slots 210', and the portable electronic device D is contacted with the first sidewall 211' in a surface contact, and contacted with bottom wall 211' and the second sidewall 213' in a line contact, so that the portable electronic device D can be stably supported within the supporting frame 21', so as to minimize the unwanted displacement between the portable electronic device D and the mounting groove 210'.

Furthermore, since the inclination angle of the portable electronic device D can be determined by the inclination angle of the first sidewall 212', the best inclination angle of the portable electronic device D can be analyzed by the statistics. In other words, the best inclination angle of the portable electronic device D is the most comfortable watching angle for the users while they are watching the screen of the portable electronic device D.

It is worth mentioning that the beverage bottle needs to be placed on a plane while the portable electronic device D is supported within the supporting frame 21', so that the mounting groove 210' is horizontally arranged. Preferably, the bottle wall 211' of the supporting frame 21' is parallel to the plane where the beverage bottle is placed, so as to make the portable electronic device D parallel to the plane.

The hand-held container 10' further comprises at least one leg support 24', wherein the leg support 24' is outwardly extended from the hand-held container 10', and the leg support 24' is adapted to support the portable electronic device D, so that the hand-held container 10' can be stably placed on a surface. It is worth mentioning that the supporting leg 24' is provided at the hand-held container 10' and is located at an opposite side of the supporting frame 21'.

It is worth mentioning that when the hand-held container 10' only comprises one leg support 24', wherein at least two points of outer wall of the hand-held container 10' and the leg support 24' are in the same plane, and the two points of the hand-held container 10' and the leg support 24' are formed a triangle, so as to make the hand-held container 10' being placed in the same plane. In other words, the hand-held container 10' is securely supported by the two points of the hand-held container 10' and the leg support 24', so that the two points of the hand-held container 10' have the same functions as the leg support 24'.

Preferably, the outer sidewall of the hand-held container 10' is curved surface, and the hand-held container 10' is cylindrical. The shape of the hand-held container 10' is configured to have the same shape of the existing water bottle. A longitudinal length of the hand-held container 10' is larger than the lateral length thereof. In order to increase the length of the mounting groove 210' and provide a large mounting space for the portable electronic device D, the mounting groove 210' is preferable longitudinally extended from the sidewall of the hand-held container 10'. In other words, the hand-held container 10' is horizontally placed, and then the edge portion of the portable electronic device D is inserted into the mounting groove 210'.

Preferably, the leg support 24' is outwardly extended from the sidewall of the hand-held container 10' along the cross-section of the hand-held container 10', such that the hand-held container 10' placed in a transverse direction can be stably supported on a flat surface, so as to avoid the scrolling occurred on the hand-held container 10'.

Preferably, the leg support 24' comprises at least one front supporting leg 241' and at least one rear supporting leg 242', wherein the front supporting leg 241' and the rear supporting leg 242' are located at two ends of the sidewall of the hand-held container 10'. The front supporting leg 241' is integrally extended from the spout unit 12' and the rear supporting leg 242' is integrally extended from the body unit 11'. Each of the outer ends of the front and rear supporting legs 241', 242' are in the same plane. The bottom wall 211' of the supporting frame 21' are parallel to the plane where each of the leg supports 24' are located, so that when the hand-held container 10' is placed on the plane and is stably supported by the leg supports 24', the bottom wall 211' of the supporting frame 21' is parallel to the plane where the hand-held container 10' is placed. In other words, the portable electronic device D mounted within the mounting groove 210' is parallel to the plane where the hand-held container 10' is placed. Preferably, the front supporting legs 241' are formed at a free edge of the spout unit 12'.

As shown in FIGS. 11, 12, and 13, the leg support 24' comprises two rear supporting legs 242', wherein the two rear supporting leg 242' are spacedly extended from the rear end of the sidewalls of the hand-held container 10' to align with the bottom wall thereof. In addition, when the hand-held container 10' is placed in a plane in an upright manner, the two rear supporting legs 242' are contacted with the plane, so as to prevent the hand-held container 10' being scrolling by subjecting to a smaller force. The leg support 24' comprises two front supporting leg 241', wherein the two rear supporting leg 242' are spacedly extended from the front end of the sidewalls of the hand-held container 10'. In addition, when the hand-held container 10' is placed in a plane in a transverse direction, the two front supporting legs 241' are contacted with the plane.

Preferably, both of the outer ends of the two rear supporting leg 242' and the two front supporting legs 241' are in the same plane.

Figure 15:
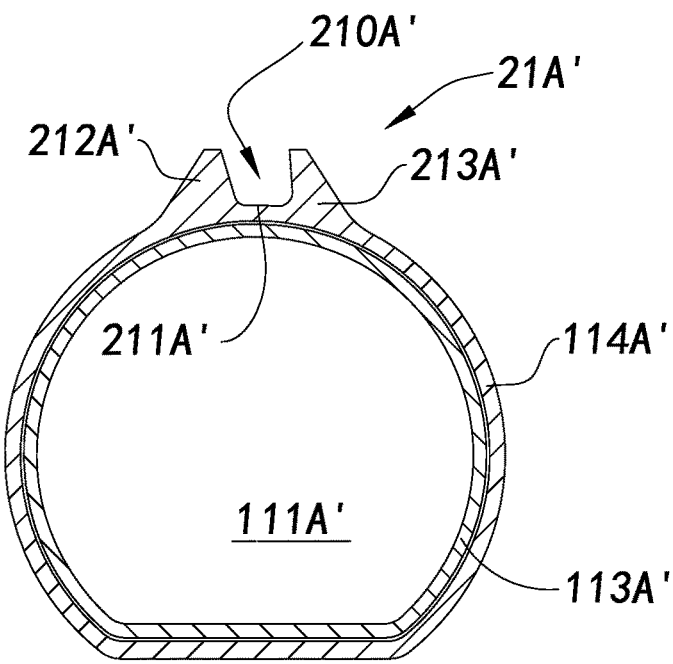
FIG. 15 illustrates a first alternative mode of the beverage bottle with the accessible station according to the above second preferred embodiment of the present invention.

It is worth mentioning that the leg support 24' is adapted to allow the beverage bottle being stably placed in a plane without the risk of rolling, so that any kinds of structure which is able to achieve this function can be used as the leg support 24'. For example, as shown in FIG. 15, the bottom sidewall of the hand-held container 10' is not formed in an arc surface, and the bottom sidewall of the hand-held container 10' is a flat platform, so that the hand-held container 10' can be stably placed on a plane through the flat platform.

Figure 14:
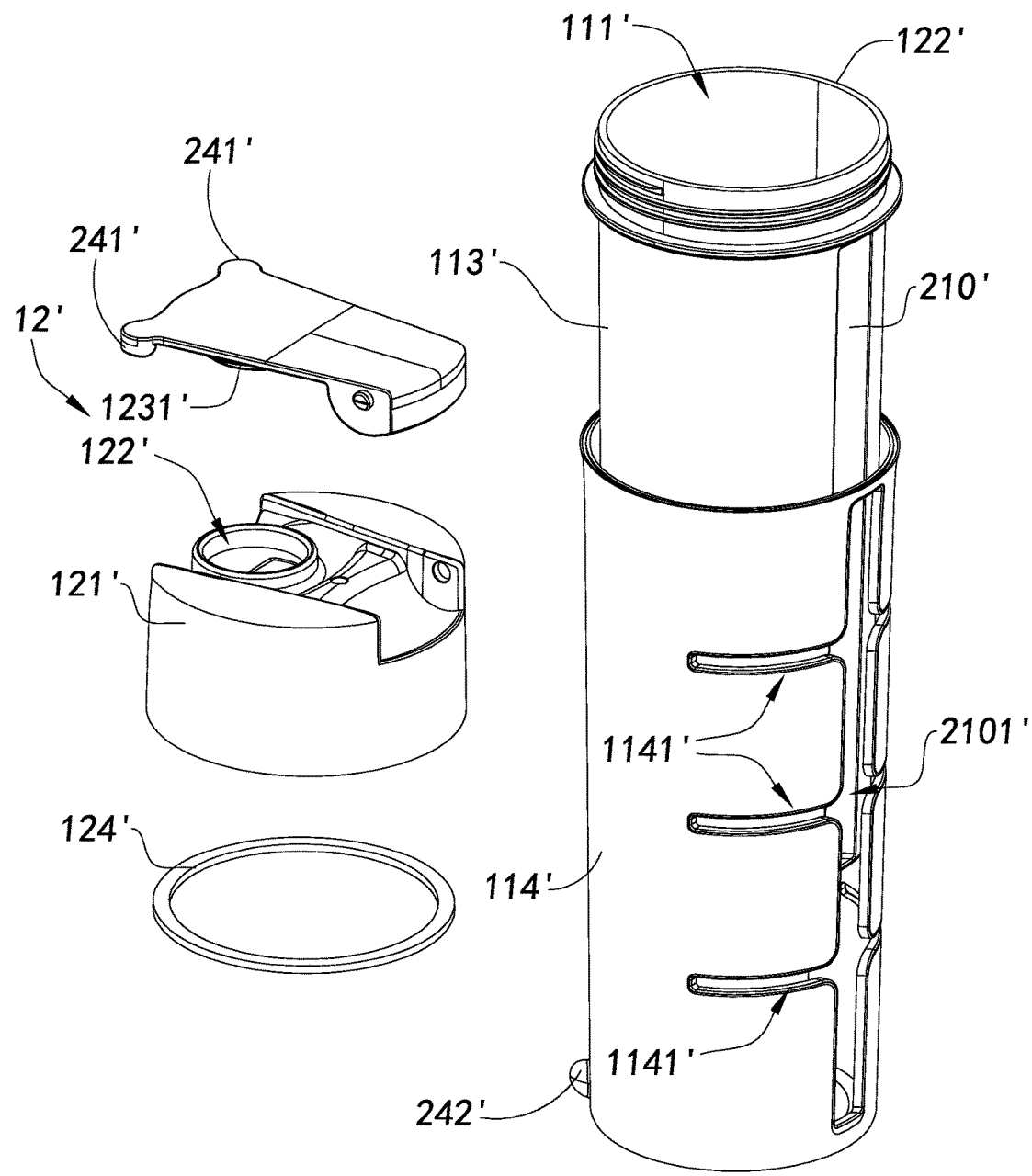
FIG. 14 is an exploded view of the beverage bottle with the accessible station according to the above second preferred embodiment of the present invention.

Referring to FIG. 14 of the drawings, the spout unit 12' comprises a spout member 121' and a movable cap 123'. The spout member 121' is provided on the top fluid opening 112' adapted to open or close the top fluid opening 112'. The spout member 121' comprises a mouth piece 122' to communicate with the top fluid opening 112', and also communicate with the fluid compartment 111', so that the user may drink the water within the fluid compartment 111' through the mouth piece 122'. The area of the mouth piece 122' is smaller than that of the top fluid opening 112', so as to prevent the water inside the fluid compartment 111' being accidently spilled out from the mouth piece 122'. When the users want to fill out the water into the fluid compartment 111', it is more convenient to fill out the water into the fluid compartment 111' through the top fluid opening 122', rather than the mouth piece 122'. The movable cap 123' is provided to open and close the mouth piece 122'.

Preferably, the spout member 121' and the body unit 11' are connected with each other by a threaded connection, wherein the inner side of the spout member 121' comprises a thread member located at a position close to the top fluid opening 112', and the top fluid opening 112' comprises a cooperating thread member, which is adapted to match with the thread member of the spout member 121'.

The movable cap 123' is movably hinged to the spout member 121', such that the movable cap 123' can be operated between an opened position and a closed position, when the movable cap 123' is in the opened position, the mouth piece 122' is opened, and when the movable cap 123' is in the closed position, the mouth piece 122' is closed.

Accordingly, two of the front supporting legs 241' are spacedly and outwardly extended from the outer end of the movable cap 123'. When the movable cap 123' is in the closed position, the front supporting legs 241' on the movable cap 123' are adapted to corporate with the other supporting legs 242' on the body unit 11' to stably support the hand-held container 10'. In addition, the two front supporting legs 241' on the movable cap 123' also can be corporated with a portion of the hand-held container 10' to stably supported thereof.

Furthermore, the leg support 24' not only can provide supporting function for the beverage bottle, but also can be used as a lever to open the movable cap 123', so as to provide the user successfully open the movable cap 123'.

Preferably, the front supporting legs 241' are spacedly and outwardly extended from two ends of the movable cap 123', and when the movable cap 123' is in the closed position, the outer end of the front supporting legs 241' and the outer end of rear supporting legs 242' are in the same plane.

Preferably, the movable cap 123' comprises a snap edge 1231' integrally extended from the inner wall of the cap 1231', wherein the snap edge 1231' is located at a position corresponding to the mouth piece 122', so as to make the movable cap 123' in the closed position. The edge of the mouth piece 122' is sealedly engaged with the snap edge 1231', so as to effectively seal the mouth piece 122', facilitates the movable cap 123' held in the closed position, and prevent the cap 123' being accidentally opened.

Preferably, the snap edge 1231' of the movable cap 123' is made of a plastic having deformability, such as polyethylene, and the edge of the mouth piece 122' is made of a plastic having a certain hardness, such as polypropylene, so as to improve the sealing ability between the snap edge 1231' and the mouth piece 122'.

Furthermore, the spout unit 12' comprises a sealing ring 124' arranged between the spout member 121' and the top fluid opening 112', wherein the sealing ring 124' is adapted to seal the edge between spout member 121' and the top fluid opening 122' while the spout member 121' is in the closed position as well as that the top fluid opening 112' is closed by the spout member 121', so as to prevent the liquid accommodating inside the fluid compartment 111' being oozed out from the edge between the spout member 121' and the top fluid opening 112'.

The body unit 11' further comprises an inner wall 112' and an outer wall 114' coaxially receiving the inner wall 112' therewithin to form a double wall structure, wherein the fluid compartment 111' is formed by the inner wall 112', and the outer wall 114' rotatably surrounds the inner wall 112'. Accordingly, the outer wall 114' can provide heat insulation to the items placed within the fluid compartment 111'. In addition, the outer wall 114' may also play a decorative role, so as to increase the aesthetics of the beverage bottle.

According to the preferred embodiment of the present invention, the supporting frame 21' is integrally formed at the inner wall 112', wherein the mounting groove 210' is integrally and longitudinally indented on the inner wall 112'. The supporting frame 21' further has an alignment groove 2101', which is a through slot, formed on the outer wall 114' to align with the mounting groove 210'. In other words, the bottom wall 211' of the supporting frame 21' is formed on the inner wall 112' of the body unit 11', so that while the edge portion of the portable electronic device D is mounted into the mounting groove 210', the edge portion of the portable electronic device D is passed through the alignment groove 2101' to insert into the mounting groove 210'. It is worth mentioning that the outer wall 114' can be rotated around the inner wall 112' to misalign the alignment groove 2101' with the mounting groove 210', such that the mounting groove 210' can be enclosed by the outer wall 114'.

Preferably, the inner wall 112' is made of a transparent material preparation, so that the mounting groove 210' formed on the inner wall 112' is transparent, and the outer wall 114' is made of an opaque material. The users can view the fluid compartment 111' of the inner wall 112' through the alignment groove 2101'. Thus, when the water is accommodated inside the fluid compartment 111', the users can freely observe the water level of the fluid compartment 111' through the alignment groove 2101'.

Preferably, the outer wall 114' comprises a plurality of water level slots 1141', wherein the water level slots 1141' laterally extended along the sidewall of the outer wall 114', so that the fluid compartment 111' can be seen through by the water level slot 1141'. Each of the water level slots 1141' represented a predetermined volume of liquid inside the fluid compartment 111'. Preferably, the specific numerical values can be labeled adjacent to the water level slot 1141', so that when the liquid level inside the fluid compartment 111' reaches the water level slot 1141', the users can know the volume of the liquid inside the fluid compartment 111' by the labeled specific numerical values nearby the water level slot 1141'.

Preferably, each of the water level slots 1141' is a through slot and is transversely formed on the outer wall 114' to intersect with the alignment groove 2101', wherein the specific numerical values are labeled at a particular side of the mounting groove 210', so as to indicate the direction of the display interface of the portable electronic device D placed within the mounting groove 210', such that the display interface of the portable electronic device D is placed toward the direction where the specific numerical values are labeled. In other words, the display interface of the portable electronic device D is tilted up.

Preferably, the inner wall 112' and the outer wall 114' are respectively made of by an injection molding. When the inner wall 112' and the outer wall 114' are contacted with each other, the inner wall 112' and the outer wall 114' can be connected with each other by an ultrasonic welding. Alternatively, the outer wall 114' can be detachably coupled with the inner wall 112', such that the inner wall 112' can be made of glass and the outer wall 114' can be made of shock absorbing material to protect the inner wall 112'. It is appreciated that the inner wall 112' and the outer wall 114' can be affixed with each other or can be detachably coupled with each other.

Referring to FIG. 15 of the drawings, a first alternative mode of the above second preferred embodiment of the present invention is illustrated, wherein the supporting frame 21A' is formed at the outer wall 114A' of the body unit 11A'. The supporting frame 21A' comprises a bottom wall 211A', a first sidewall 212A' and a second sidewall 213A', and the mounting groove 210A' is formed between the bottom wall 211A', the first sidewall 212A' and the second sidewall 213A'. In other words, the first sidewall 212A' and the second sidewall 213A' are integrally and outwardly extended to form the mounting groove 210A' having a certain depth, so that the portable electronic device D can be stably supported inside the mounting groove 210A'.

It is worth mentioning that, in the first alternative mode of the above second preferred embodiment of the present invention, the inner wall 113A' is completely encircled by the outer wall 114A', so as to provide better thermal insulation to the fluid compartment 111A'.

Figure 16:
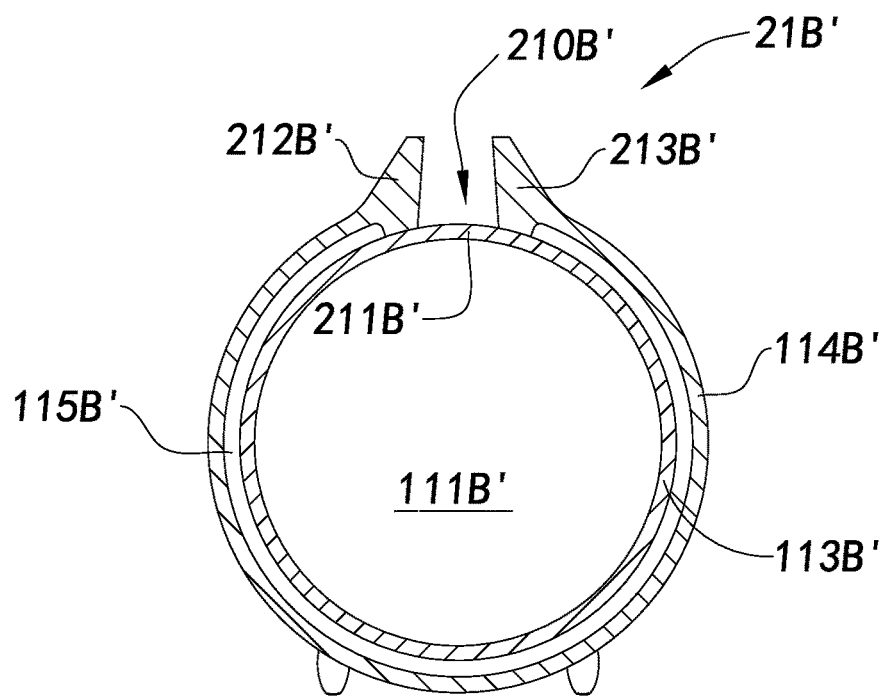
FIG. 16 illustrates a second alternative mode of the beverage bottle with the accessible station according to the above second preferred embodiment of the present invention.

Referring to FIG. 16 of the drawings, a second alternative mode of the above second preferred embodiment of the present invention is illustrated, wherein the outer wall 114B' has a mounting groove 210B', wherein two sidewalls of the mounting slot 2101B' are formed by the first sidewall 212B' and the second sidewall 213B' of the supporting frame 21B', and the bottom wall 211B' of the supporting frame 21B' is formed by the outer circumferential surface of the inner wall 113B'. The mounting groove 210B' is formed between the bottom wall 211B', the first sidewall 212B' and the second sidewall 213B'.

Preferably, the first sidewall 212B' and the second sidewall 213B' are integrally, radially, and outwardly extended from the outer wall 114B' to form the mounting groove 210B' having a certain depth, so that the portable electronic device D can be stably supported inside the mounting groove 210B'. The configuration of the mounting groove 210B' can be formed as shown in FIGS. 13A to 13C.

Preferably, a cavity 115B' are formed between the inner wall 113B' and the outer wall 114B', wherein air or other substance can be filled into the cavity 115B'. When the air is filled into the cavity 115B', the fluid compartment 111B' has a better thermal insulation due to that the thermal conductivity of the air is small. When other substances are filled into the cavity 115B', the liquid placed inside the fluid compartment 111B' can be rapidly cooled or heated. For example, a liquid can be sealed into the cavity 115B' and placed the beverage bottle into a refrigerator, so that the liquid is maintained at a lower temperature. After that, when a user wants to immediately drink iced drinks, the beverage can be poured into the fluid compartment 111B', such that the low temperature liquid inside the cavity 115B' can rapidly cool the beverage inside the fluid compartment 111B', so as to quickly form the iced drinks.

It is worth mentioning that, in the second alternative mode of the above mentioned second preferred embodiment of the present invention, the user can observe the fluid compartment 111B' through the mounting groove 210B', so as to facilitate the user at any time to observe the condition of the fluid compartment 111B'.

Figure 17:
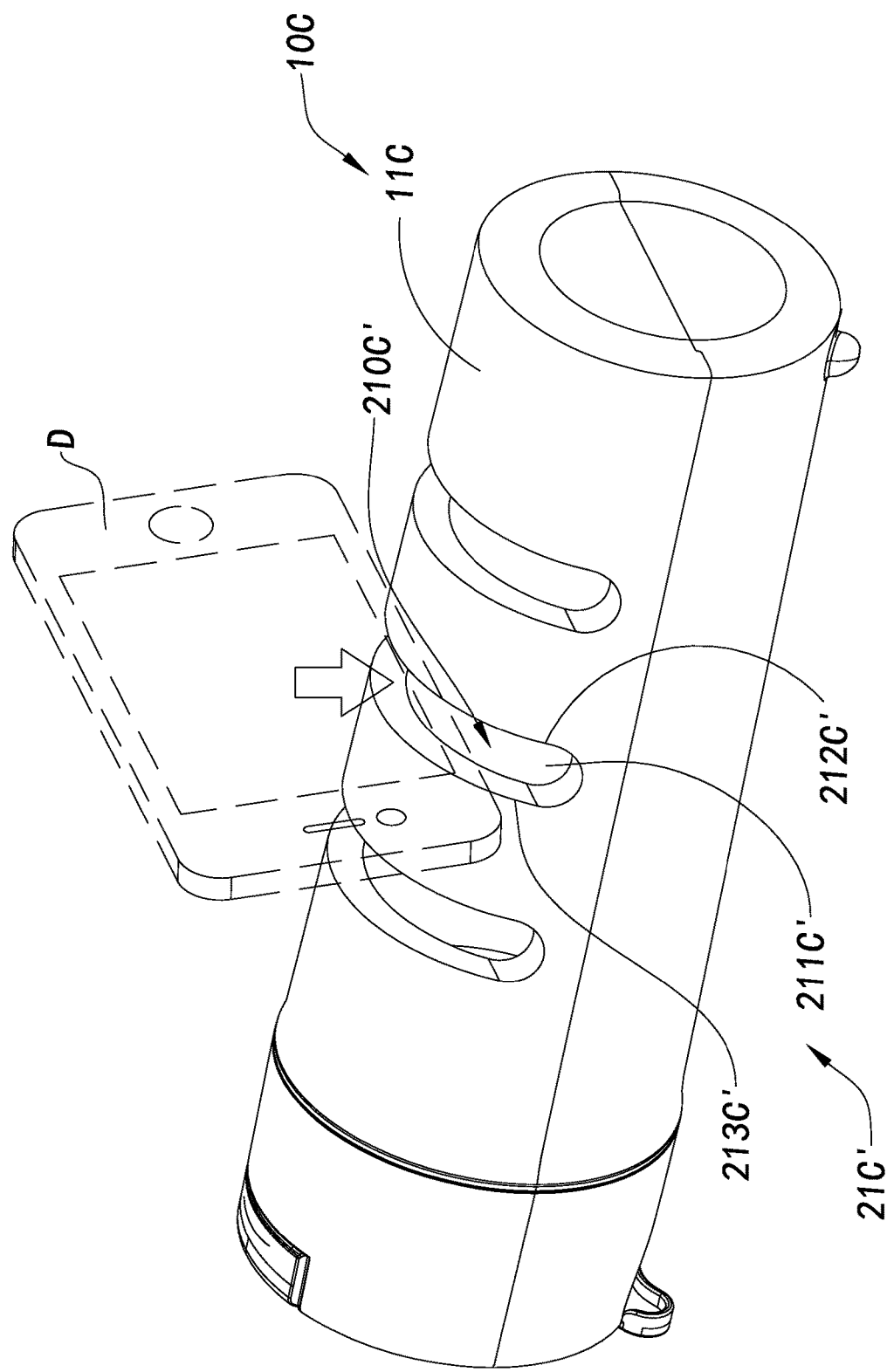
FIG. 17 illustrates a third alternative mode of the beverage bottle with the accessible station according to the above second preferred embodiment of the present invention.

Referring to FIG. 17 of the drawings, a third alternative mode of the above second preferred embodiment of the present invention is illustrated, wherein the mounting groove 210C' is transversely formed at the hand-held container 10C'. Preferably, the supporting frame 21C' is extended from the outer wall of the body unit 11C' to form the mounting groove 210C', wherein the supporting frame 21C' comprises the bottom wall 211C', a first sidewall 212C' and a second sidewall 213C'. The first sidewall 212C' and the second sidewall 213C' are respectively extended from the outer wall of the body unit 11C' to the bottom wall 211C' along a cross-section of the body unit 11C'. The edge portion of the portable electronic device D is adapted to insert into the mounting groove 210C'. Preferably, two or more the mounting grooves 210C' are parallelly formed at the outer wall of the body unit 11C', wherein the mounting grooves 210C' are parallel with each other. In particular, each of the mounting grooves 210C' can be configured as shown in FIGS. 13A to 13C. Preferably, the configurations of the mounting grooves 210C' are different to provide different supporting orientations of the portable electronic device D at the mounting grooves 210C'.

It is worth mentioning that while the portable electronic device D is in use, the portable electronic device D will commonly generate a huge amount of heat, so that the life span of the portable electronic device will be greatly reduced. The present invention is provided to solve the mentioned problem. When the cool liquid, such as ice water, is contained in the fluid compartment 111', 111A', 111B', and 111C', the mounting groove 210', 210A', 210B', and 210C' are maintained at a lower temperature, so as to facilitate the heat dispersion of the portable electronic device D.

Figure 18:
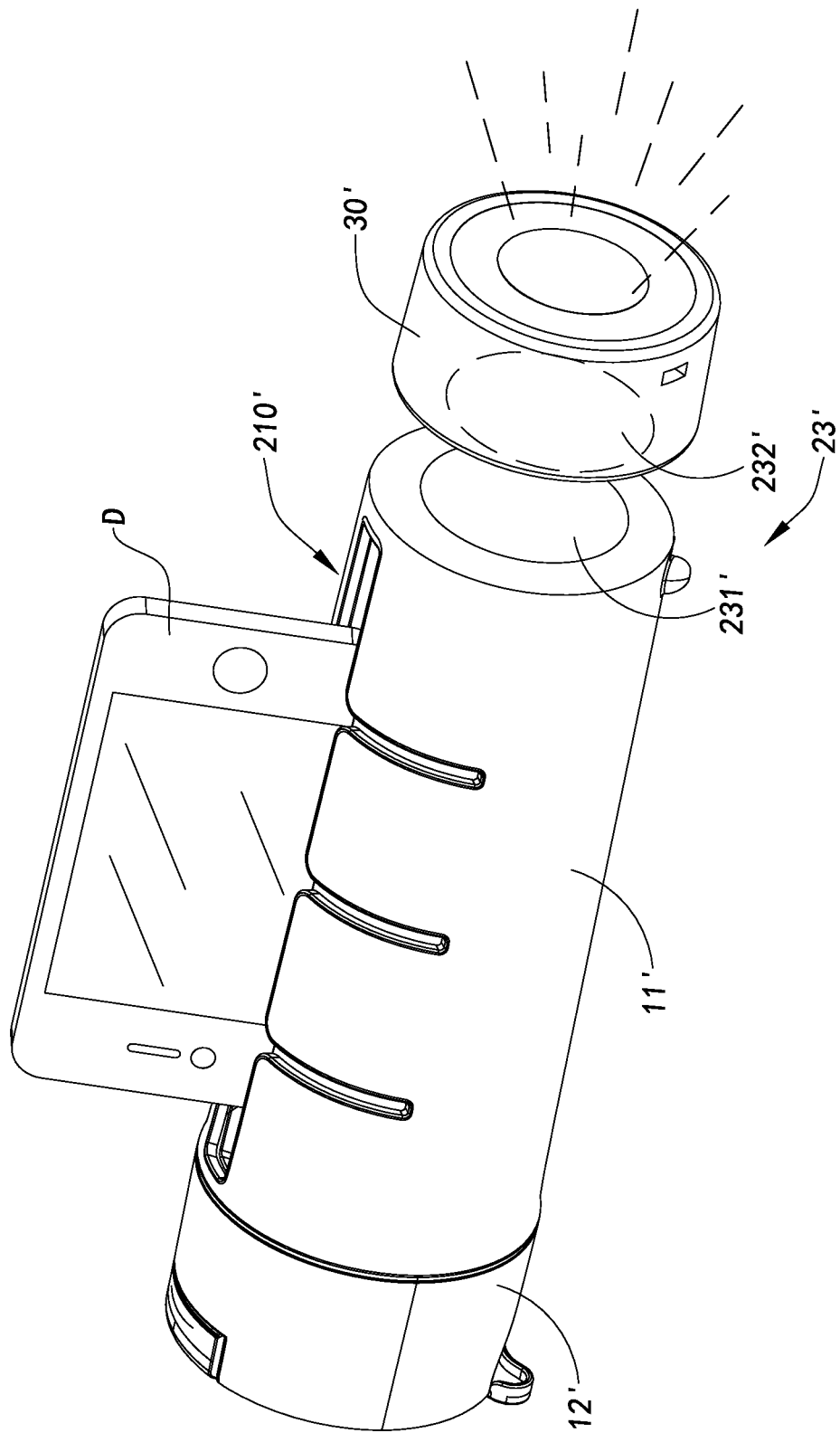
FIG. 18 is a perspective view of the beverage bottle with the accessible station according to the above second preferred embodiment of the present invention, illustrating the hand-held container being transversely placed on a plane.

Referring to FIG. 18 of the drawings, the hand-held container 10' further comprises an accessory mounting unit 23' formed in a bottom portion of the hand-held container 10' and a utility base 30' being installed at a bottom portion of the hand-held container 10' by the accessory mounting unit 23', wherein the utility base 30' may comprise a flash light, a portable audio device, a rechargeable power supply, and so on.

Preferably, the accessory mounting unit 23' comprises a first magnetic member 231' provided on the bottom surface of the hand-held container 10' and a second magnetic member 232' provided on the utility base 30', wherein the first magnetic member 231' and the second magnetic member 232' are adapted to attach with each other by the magnetic attraction, so that the utility base 30' can be detachably attached on the bottom portion of the hand-held container 10' through the magnetic attraction between the first and second magnetic member 231', 232'.

Figure 19:
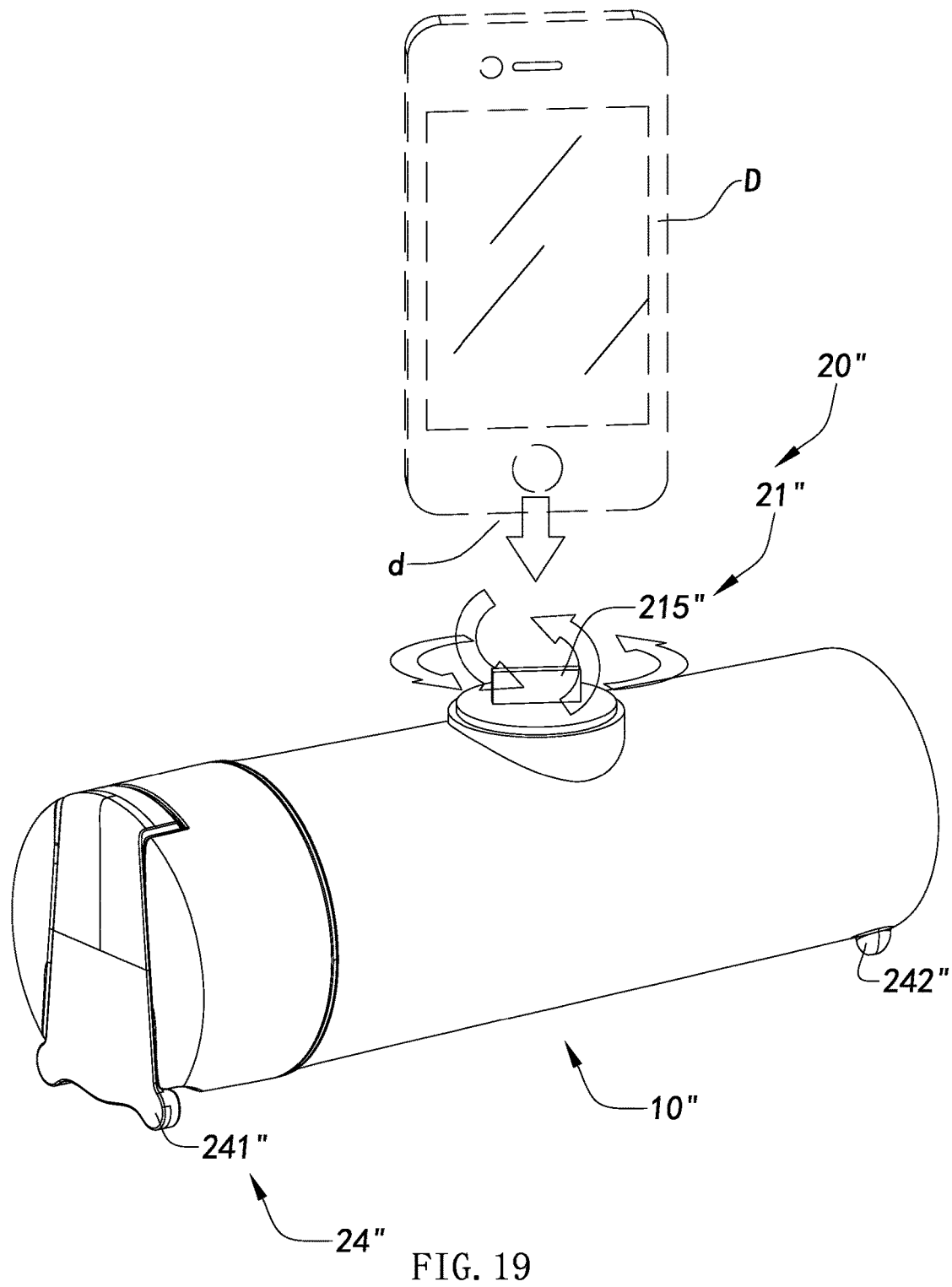
FIG. 19 is a perspective view of a beverage bottle with an accessible station for a portable electronic device according to a third preferred embodiment of the present invention.

Referring to FIG. 19 of the drawings, a beverage bottle according to a third preferred of the present invention is illustrated, wherein the beverage bottle comprises a hand-held container 10" to store water or other items. The hand-held container 10" further comprises an accessible station 20", wherein the accessible station 20" comprises a supporting frame 21' formed on the hand-held container 10" to stably supported at least one portable electronic device D.

The portable electronic device D has at least one connecting terminal d. Most of the portable electronic device D has a power connector or USB data interface, which can be used as the connecting terminal d.

The supporting frame 21" comprises a connecting plug 215" outwardly and radially extended from the hand-held container 10", wherein the connecting plug 215" is adapted to insert into the connecting holes d of the portable electronic device D to fix the portable electronic device D on the hand-held container 10". It is worth mentioning that most of the portable electronic device D has the same size of the connecting terminal d. In other words, when the hand-held container 10" is placed at a horizontal orientation, the portable electronic device D is supported at a vertical orientation as shown in FIG. 19.

Preferably, the supporting frame 21" is rotatably arranged on the hand-held container 10", so that the connecting plug 215" can be rotated by rotating the supporting frame 21", and then the portable electronic device D also can be rotated by the rotation of the supporting frame 21". Therefore, the user can selectively adjust the angle of the portable electronic device D via the rotation of the supporting frame 21".

It is worth mentioning that the supporting frame 21" can be rotated and pivotally moved by a connecting member provided on the hand-held container 10", so that the supporting frame 21" can be rotated and pivotally moved with respect to the hand-held container 10". For example, the supporting frame 21" can be rotatably and pivotally moved with respect to the hand-held container 10" by a ball joint structure provided on the hand-held container 10", so that the supporting frame 21" not only rotates in the vertical direction, but also pivotally moves in the inclination direction, so the inclination angle of the portable electronic device D can be adjusted.

The hand-held container 10" further comprises at least one leg support 24" outwardly extended from the hand-held container 10", and the leg support 24" is adapted to support the portable electronic device D, so that the hand-held container 10" can be stably place on a plane.

Preferably, the hand-held container 10" is a cylindrical, and a longitudinal length of the hand-held container 10' is larger than the lateral length thereof. The supporting frame 21" is provided on the sidewall of the hand-held container 10", and the connecting plug 215" is outwardly and radially extended from the sidewall of the hand-held container 10" along the cross-sectional direction of the hand-held container 10". In other words, the hand-held container 10" can be horizontally placed when in use as well as that the portable electronic device D is mounted on the connecting plug 215".

Preferably, the leg support 24" is outwardly extended from on the sidewalls of the hand-held container 10" along the cross-section of the hand-held container 10" adapted to be securely supported the hand-held container 10" placed along the transverse direction, so as to avoid the cylindrical shape hand-held container 10" being rolled.

Preferably, the leg support 24" comprises at least one front supporting leg 241" and at least one rear supporting leg 242", which are separately located at two ends of the sidewall of the hand-held container 10". Each of the outer ends of the front and rear supporting legs 241", 242" is in the same plane, so as to stably support the beverage bottle on the same plane.

Figure 20A:
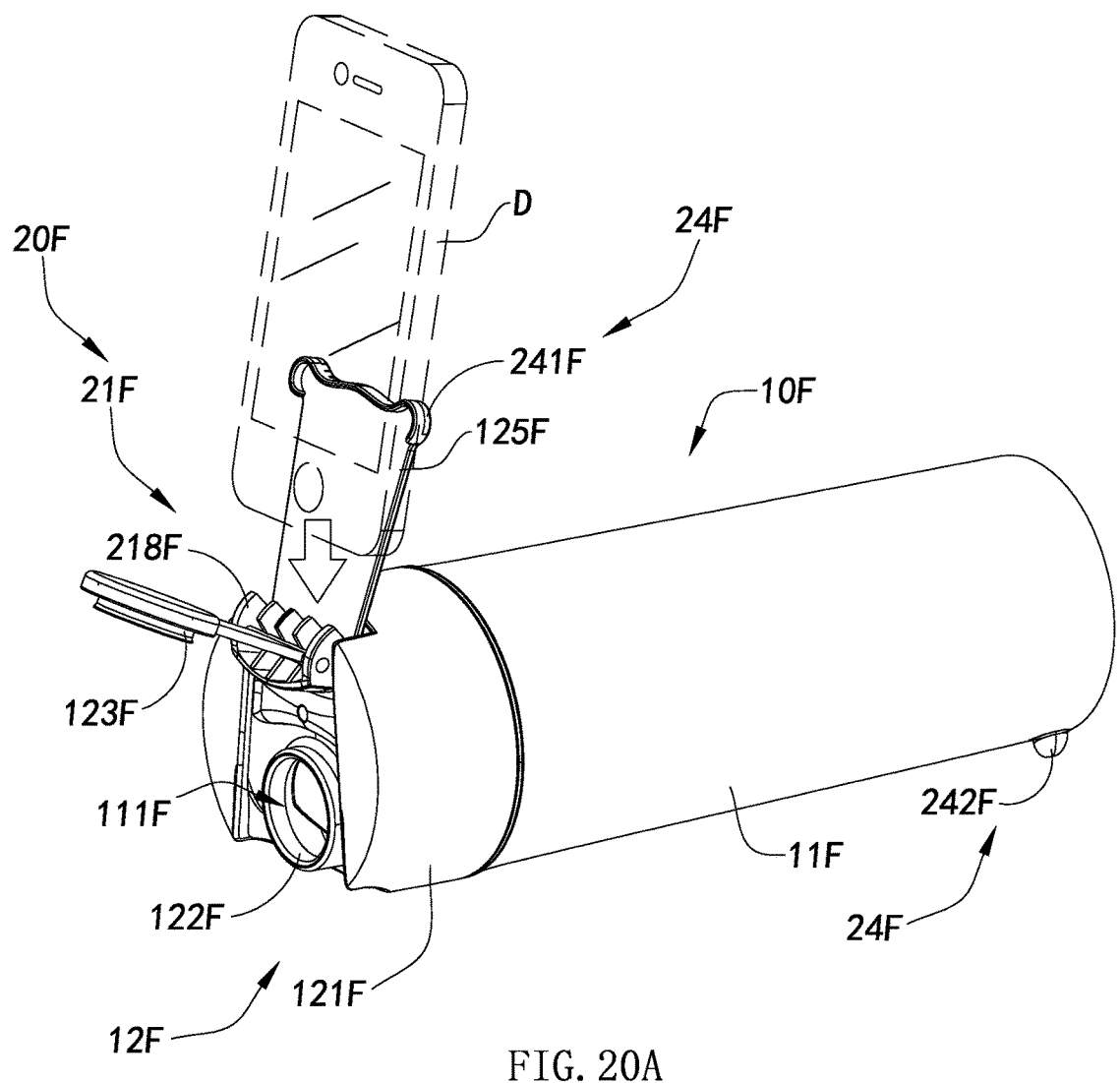
FIG. 20A and FIG. 20B illustrate a portable electronic device being mounted on the supporting frame according to the above third preferred embodiment of the present invention.

Referring to FIG. 20A of the drawings, a beverage bottle according to a fourth preferred embodiment of the present invention is illustrated, wherein the beverage bottle comprises a hand-held container 10F.

The hand-held container 10F comprises a body unit 11F and a spout unit 12F, wherein the body unit 11F defines a fluid compartment 111F adapted to store water or other items, and the body unit 11F comprises a top fluid opening adapted to allow the fluid compartment 111F communicating with outside. In other words, the spout unit 12F is adapted to open and close the fluid compartment 111F of the body unit 11F Accordingly, the hand-held container 10F further comprises an accessible station 20F, wherein the accessible station 20F comprises a supporting frame 21F. The supporting frame 21F comprises a retaining arm 218F extended from the spout unit 12F, wherein the retaining arm 218F is adapted to allow the portable electronic device D being seated thereon, so that the portable electronic device D can be stable supported by the retaining arm 218F and a surface of the spout unit 12F.

As shown in FIG. 20A, the spout unit 12F comprises a spout member 121F, a first movable cap 123F, and a second movable cap 125F, wherein the spout member 121F is adapted to open or close the top fluid opening. The spout member 121F comprises a mouth piece 122F to communicate with the top fluid opening, and also communicate with the fluid compartment 111F, so that the user may drink the water within the fluid compartment 111F through the mouth piece 122F. The area of the mouth piece 122F is smaller than that of the top fluid opening, so as to prevent the water inside the fluid compartment 111F being accidently spilled out from the mouth piece 122F. When the users want to fill out the water into the fluid compartment 111F, it is convenient to fill out the water into the fluid compartment 111F through the top fluid opening, rather than the mouth piece 122F. The first movable cap 123F is pivotally coupled at the spout member 121F to open or close the mouth piece 122F. The second movable cap 125F is pivotally coupled at the spout member 121F, so as to be pivotally folded between an open position and a closed position. When the second movable cap 125F is in the closed position, the first movable cap 123F is covered by the second movable cap 125F, so as to remain the first movable cap 123F in the closed position to form a double cap structure to prevent the water leakage from the mouth piece 122F. In other words, when the second movable cap 125F is in the opened position, the first movable cap 123F can be opened.

Preferably, the retaining arm 218F is integrally extended from an inner wall of the second movable cap 125F close to the pivot edge of the retaining arm 218F, so that while the second movable cap 125F is in the opened position to expose the retaining arm 218F, the portable electronic device D can be seated on the retaining arm 218F and can be supported by the second movable cap 125F.

Preferably, the second movable cap 125F can be switched between a first opened position and a second opened position. That is to say, the second movable cap 125F can be maintained in a first opened position, and also can be held in the second opened position. In other words, different angles, i.e. the pivotally folding angle, of the second movable cap 125F will selected adjusted with respect to the spout member 121F through the pivotal movement of the second movable cap 125F in the first opened position or in the second opened position.

As shown in FIG. 20A, when the beverage bottle is horizontally placed on a plane, and the second movable cap 125F is in the first opened position, and the first movable cap 123F is in the opened position, so that the pivotally folding angle of the second movable cap 125F is larger than 90 degrees. In other words, the portable electronic device D can be stably mounted between the retaining arm 218F and an inner wall of the second movable cap 125F, so as to allow the user being easily observe the display interface of the portable electronic device D.

Figure 20B:
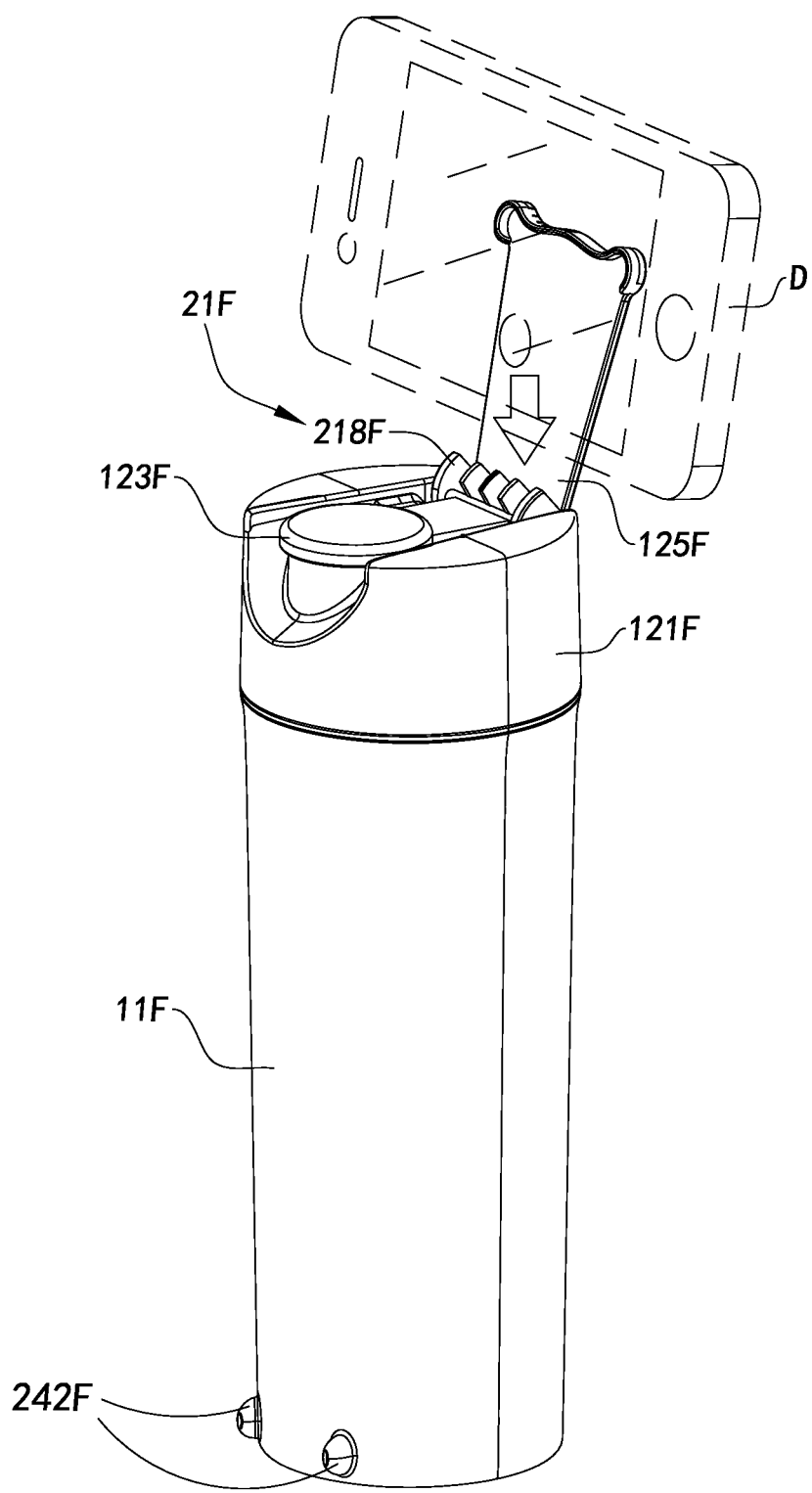

As shown in FIG. 20B, when the beverage bottle is vertically placed on a plane, and the second movable cap 125F is in the second opened position, and the first movable cap 123F is in the closed position, so that the pivotally folding angle of the second movable cap 125F should not be larger than 90 degrees. In other words, the portable electronic device D can be stably mounted between the retaining arm 218F and an inner wall of the second movable cap 125F, so as to allow the user being easily observe the display interface of the portable electronic device D.

The hand-held container 10F further comprises at least one leg support 24F outwardly extended from the hand-held container 10F, and the leg support 24F is adapted to support the portable electronic device D, so that the hand-held container 10F can be stably place on a plane. Accordingly, the front supporting legs 241F are spacedly formed at a free end of the second movable cap 125F.

Preferably, the hand-held container 10F is a cylindrical, and the leg support 24F is outwardly extended from a curved sidewall of the hand-held container 10F, so as to prevent that the hand-held container F is rolling around while the curved sidewall of the hand-held container is placed on the plane.

Figure 21:
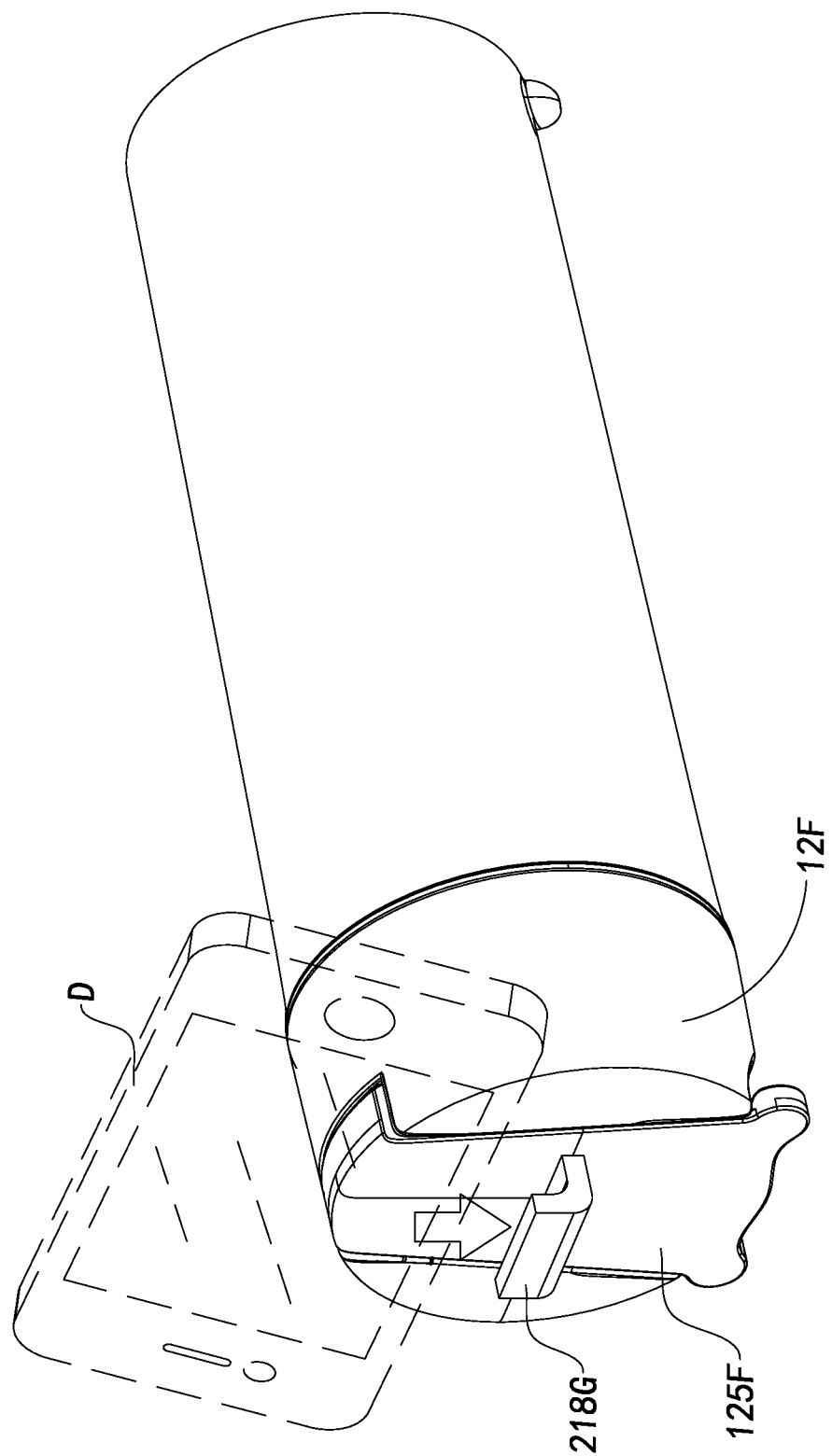
FIG. 21 is a perspective view of a beverage bottle with an accessible station for a portable electronic device according to a fourth preferred embodiment of the present invention.

Referring to FIG. 21 of the drawings, an alternative mode of a beverage bottle according to the above fourth preferred embodiment of the present invention is illustrated, wherein the retaining arm 218G is outwardly and upwardly extended from an outer wall of the spout unit 12F, so that when the beverage bottle is horizontally placed on a plane, the portable electronic device D is supported between the retaining arm 218G and the outer wall of the spout unit 12F. Preferably, the retaining arm 218G has a hook shape formed at the spout unit 12F, such as the second movable cap 125F thereof.

Figure 22:
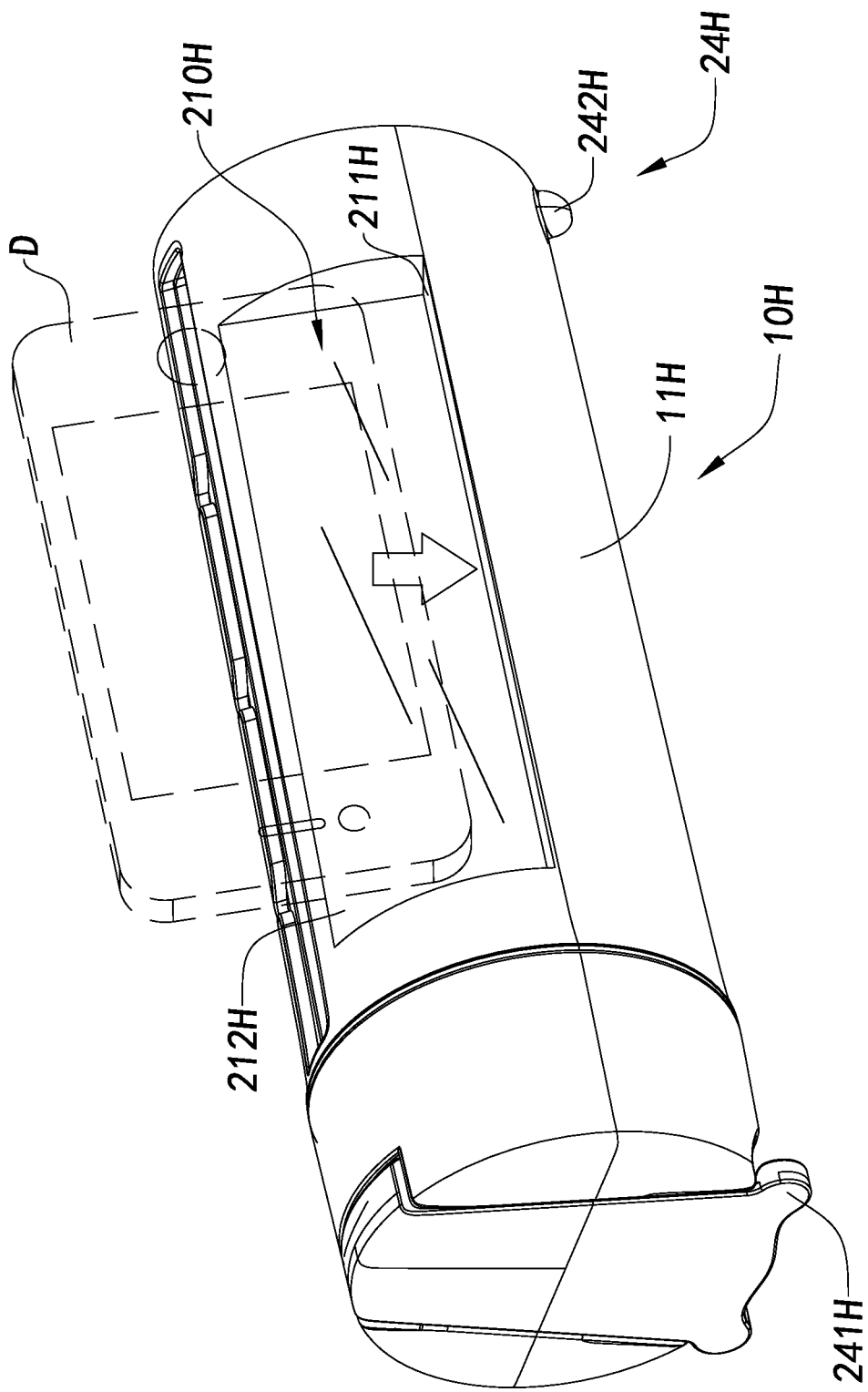
FIG. 22 is a perspective view of a beverage bottle with an accessible station for a portable electronic device according to a fifth preferred embodiment of the present invention.

Referring to FIG. 22 of the drawings, a beverage bottle according to a fifth preferred embodiment of the present invention is illustrated, wherein the beverage bottle comprises a hand-held container 10H. The hand-held container 10H comprises an accessible station 20H, wherein the accessible station 20H comprises a supporting frame 21H to stably support at least one portable electronic device D.

The hand-held container 10H comprises a fluid compartment adapted to store water or other items.

The supporting frame 21H is formed on the hand-held container 10H, wherein the supporting frame 21H is inwardly extended from an outer wall of the hand-held container 10H to form a supporting seat 210H.

The supporting frame 21H comprises a bottom wall 211H and a back supporting wall 212H, wherein the back supporting wall 212H and the bottom wall 211H are integrally and inwardly indented on an outer wall of the body unit 11H, so that the supporting seat 210H is formed on the outer surface of the body unit 11H and is defined within the bottom wall 211H and the back supporting wall 212H. When the portable electronic device D is inserted into the supporting seat 210H, the bottom wall 211H of the supporting frame 21H is adapted to support a bottom wall of the portable electronic device D, and a rear wall of the portable electronic device D are supported by the back supporting wall 212H, so as to allow the display interface of the portable electronic device D being exposed outside.

The hand-held container 10H further comprises at least one leg support 24H outwardly extended from the hand-held container 10H, and the leg support 24H is adapted to support the portable electronic device D, so that the hand-held container 10H can be stably place on a plane.

Preferably, the hand-held container 10H is a cylindrical, and the supporting frame 21H is outwardly extended from a curved sidewall of the hand-held container 10H. The leg support 24H is outwardly extended from the sidewall of the hand-held container 10H along the cross-section direction of the hand-held container 10H, so that the hand-held container 10H can be stably supported on a plane while the hand-held container 10H is transversely placed on the plane.

The leg support 24H comprises at least one front supporting leg 241H and at least one rear supporting leg 242H, which are separately located at two ends of the sidewall of the hand-held container 10H. Each of the outer ends of the front and rear supporting legs 241H, 242H is in the same plane, so as to stably support the beverage bottle on the same plane.

Preferably, the bottom wall 211H of the supporting frame 21H is upwardly and outwardly inclined arranged with respect to a plane where the front and rear supporting legs 241H, 242H are placed on, wherein the first sidewall 212H is perpendicular to the bottom wall 211H of the supporting frame 21H, so that while the hand-held container 10H is placed on the plane via the leg support 24H and the portable electronic device is placed inside the mounting groove 210H, the portable electronic device is able to rearwardly and inclinedly arranged, so as to enable the display interface of the portable electronic device being observed by the viewer in a more comfortable angle.

It is worth mentioning that the above embodiments and their alternatives are interchangeable, such that the supporting frame can be integrated with one of the body unit and the spout unit for stably supporting the portable electronic device at a predetermined angle. In addition, the leg support according to the embodiments and their alternatives is provided at the hand-held container and located opposite to the supporting frame to stably support the hand-held container at either the vertical orientation or horizontal orientation so as to stably support the portable electronic device. It is worth mentioning that two or more supporting can be integrated with the body unit and the spout unit, such that the user is able to selectively hold the portable electronic device at different locations of the hand-held container. Likewise, the utility base can be detachably coupled to the body unit of any one of the above mentioned embodiments and their alternatives via the accessory mounting unit.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A beverage bottle for a portable electronic device, comprising:
   a hand-held container which comprises a body unit having a fluid compartment for containing beverage therein, and a spout unit, having a mouth piece, detachably coupled at said body unit to enclose said fluid compartment; and
   an accessible station which comprises a supporting frame integrated with one of said body unit and said spout unit of said hand-held container for stably supporting the portable electronic device at a position that the portable electronic device stands on said supporting frame with a predetermined angle, wherein said supporting frame has a mounting groove indented on an outer surface of said body unit for receiving an edge portion of the portable electronic device, wherein a width of said mounting groove is larger than a thickness of the portable electronic device.

2. The beverage bottle, as recited in claim 1, wherein said mounting groove defines a first sidewall, a second sidewall, and a bottom wall, wherein said first sidewall is inclinedly extended from said bottom wall for supporting the edge portion of the portable electronic device.

3. The beverage bottle, as recited in claim 2, wherein an angle between said first sidewall and said bottom wall is an obtuse angle.

4. The beverage bottle, as recited in claim 2, wherein an angle between said first sidewall and said bottom wall is an acute angle.

5. The beverage bottle, as recited in claim 1, wherein said mounting groove is longitudinally extended along said outer surface of said body unit.

6. The beverage bottle, as recited in claim 1, wherein said body unit comprises an inner wall defining said fluid compartment therein, and an outerwall coaxially receiving said inner wall to form a double wall structure, wherein said mounting groove is integrally indented on said inner wall.

7. The beverage bottle, as recited in claim 6, wherein said supporting frame further has an elongated through alignment groove formed on said outer wall and aligned with said mounting groove.

8. The beverage bottle, as recited in claim 7, wherein said outer wall further has a plurality of through water level slots spacedly extended therein to intersect with said alignment groove.

9. The beverage bottle, as recited in claim 1, wherein said body unit comprises an inner wall defining said fluid compartment therein, and an outer wall coaxially receiving said inner wall to form a double wall structure, wherein said mounting groove is integrally indented on said outer wall.

10. The beverage bottle, as recited in claim 1, wherein two or more of said mounting groove are parallelly and transversely extended along said outer surface of said body unit.

11. A beverage bottle for a portable electronic device, comprising:
    a hand-held container which comprises a body unit having a fluid compartment for containing beverage therein, and a spout unit, having a mouth piece, detachably coupled at said body unit to enclose said fluid compartment; and
    an accessible station which comprises a supporting frame integrated with one of said body unit and said spout unit of said hand-held container for stably supporting the portable electronic device at a position that the portable electronic device stands on said supporting frame with a predetermined angle, wherein said supporting frame comprises a connecting plug outwardly protruded from an outer surface of said body unit for detachably coupling with a connecting terminal of the portable electronic device so as to support the portable electronic device.

12. The beverage bottle, as recited in claim 11, wherein said connecting plug are rotatably coupled at said outer surface of said body unit for selectively adjust an angle of the portable electronic device.

13. A beverage bottle for a portable electronic device, comprising:
    a hand-held container which comprises a body unit having a fluid compartment for containing beverage therein, and a spout unit, having a mouth piece, detachably coupled at said body unit to enclose said fluid compartment; and
    an accessible station which comprises a supporting frame integrated with one of said body unit and said spout unit of said hand-held container for stably supporting the portable electronic device at a position that the portable electronic device stands on said supporting frame with a predetermined angle, wherein said supporting frame comprises a retaining arm integrally extended from said spout unit for allowing the portable electronic device being seated thereon so as to support the portable electronic device on said spout unit.

14. The beverage bottle, as recited in claim 13, wherein said spout unit comprises a spout member defining said mouth piece thereat, a first movable cap pivotally coupled at said spout member to selectively open and close said mouth piece, and a second movable cap pivotally coupled at said spout member to selectively to cover on said first movable cap, wherein said retaining arm is integrally extended from an inner wall of said second movable cap, such that when said second movable cap is pivotally folded away from said first movable cap, said retaining arm is exposed for supporting the portable electronic device.

15. The beverage bottle, as recited in claim 13, wherein said retaining arm has a hook shape integrally formed at an outer wall of said spout unit for supporting the portable electronic device on said spout unit.

16. A beverage bottle for a portable electronic device, comprising:
    a hand-held container which comprises a body unit having a fluid compartment for containing beverage therein, and a spout unit, having a mouth piece, detachably coupled at said body unit to enclose said fluid compartment; and
    an accessible station which comprises a supporting frame integrated with one of said body unit and said spout unit of said hand-held container for stably supporting the portable electronic device at a position that the portable electronic device stands on said supporting frame with a predetermined angle, wherein said supporting frame has a supporting seat indented on an outer surface of said body unit to define a bottom wall and a back supporting wall, wherein said supporting seat is arranged for supporting the portable electronic device at a position that a bottom wall of the portable electronic device is supported on said bottom wall of said supporting seat while a rear wall of the portable electronic device is supported by said back supporting wall of said supporting seat.

17. A beverage bottle for a portable electronic device, comprising:
a hand-held container which comprises a body unit having a fluid compartment for containing beverage therein, and a spout unit, having a mouth piece, detachably coupled at said body unit to enclose said fluid compartment;
an accessible station which comprises a supporting frame integrated with one of said body unit and said spout unit of said hand-held container for stably supporting the portable electronic device at a position that the portable electronic device stands on said supporting frame with a predetermined angle; and
a leg support provided at said hand-held container and located opposite to said supporting frame.

18. The beverage bottle, as recited in claim 17, wherein said leg support comprises a front supporting arm integrally extended from said spout unit and a rear supporting arm integrally extended from said body unit.

19. A beverage bottle for a portable electronic device, comprising:
a hand-held container which comprises a body unit having a fluid compartment for containing beverage therein, and a spout unit, having a mouth piece, detachably coupled at said body unit to enclose said fluid compartment;
an accessible station which comprises a supporting frame integrated with one of said body unit and said spout unit of said hand-held container for stably supporting the portable electronic device at a position that the portable electronic device stands on said supporting frame with a predetermined angle; and
a utility base detachably coupled at a bottom surface of said body unit, wherein said utility base comprises at least one of a flash light, a portable audio device, and a rechargeable power supply.

20. The beverage bottle, as recited in claim 19, further comprising an accessory mounting unit which comprises a first magnetic member provided at said bottom surface of said body unit and a second magnetic member provided on said utility base, such that said second magnetic member is magnetically attracted to said first magnetic member to detachably couple said utility base at said body unit.

* * * * *